United States Patent
Li et al.

(10) Patent No.: US 12,170,901 B2
(45) Date of Patent: *Dec. 17, 2024

(54) SECURITY CONTEXT OBTAINING METHOD AND APPARATUS, AND COMMUNICATIONS SYSTEM

(71) Applicant: Honor Device Co., Ltd., Shenzhen (CN)

(72) Inventors: Fei Li, Shenzhen (CN); Bo Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,137

(22) Filed: Oct. 11, 2023

(65) Prior Publication Data

US 2024/0040380 A1 Feb. 1, 2024

Related U.S. Application Data

(63) Continuation of application No. 17/114,812, filed on Dec. 8, 2020, now Pat. No. 11,818,578, which is a
(Continued)

(30) Foreign Application Priority Data

May 31, 2019 (CN) .......................... 201910470895.8

(51) Int. Cl.
*H04W 12/106* (2021.01)
*H04W 8/08* (2009.01)
(Continued)

(52) U.S. Cl.
CPC .......... *H04W 12/106* (2021.01); *H04W 8/08* (2013.01); *H04W 8/18* (2013.01); *H04W 12/04* (2013.01);
(Continued)

(58) Field of Classification Search
CPC .......... H04W 36/0038; H04W 12/106; H04W 12/06; H04W 12/04
See application file for complete search history.

(56) References Cited

U.S. PATENT DOCUMENTS 9,084,110 B2   7/2015 Escott et al.
10,433,161 B2  10/2019 Norrman et al.
(Continued)

FOREIGN PATENT DOCUMENTS

CN     108401269 A     8/2018
CN     108702798 A    10/2018
(Continued)

OTHER PUBLICATIONS

NPL Search Terms (Year: 2024).*
(Continued)

*Primary Examiner* — Syed A Zaidi
(74) *Attorney, Agent, or Firm* — Conley Rose, P.C.

(57) ABSTRACT

A security context obtaining method includes: a first access and mobility management function (AMF) receiving a first registration request message sent by a user equipment (UE) and validating integrity protection for the first registration request message; if the first AMF successfully validates integrity protection for the first registration request message, sending, by the first AMF, a second request message to a second AMF; the second AMF receiving the second request message; and if the second request message carries indication information and the indication information is used to indicate that the UE is validated, sending, by the second AMF, a security context of the UE to the first AMF.

20 Claims, 7 Drawing Sheets

Related U.S. Application Data continuation of application No. PCT/CN2020/089621, filed on May 11, 2020.

(51) Int. Cl.
*H04W 8/18* (2009.01)
*H04W 12/04* (2021.01)
*H04W 12/06* (2021.01)
*H04W 12/75* (2021.01)
*H04W 36/00* (2009.01)
*H04W 60/00* (2009.01)
*H04W 36/14* (2009.01)
*H04W 84/04* (2009.01)

(52) U.S. Cl.
CPC .......... *H04W 12/06* (2013.01); *H04W 12/75* (2021.01); *H04W 36/0038* (2013.01); *H04W 60/00* (2013.01); *H04W 36/1443* (2023.05); *H04W 84/042* (2013.01)

(56) References Cited

U.S. PATENT DOCUMENTS

| | | | |
|---|---|---|---|
| 10,512,005 | B2 | 12/2019 | Horn et al. |
| 10,531,292 | B2 | 1/2020 | Ben Henda et al. |
| 10,736,072 | B2 | 8/2020 | Youn et al. |
| 11,102,649 | B2 | 8/2021 | Jost et al. |
| 11,452,001 | B2 | 9/2022 | Liao et al. |
| 2012/0155428 | A1 | 6/2012 | Bovo et al. |
| 2018/0199279 | A1 | 7/2018 | Baek et al. |
| 2018/0227842 | A1 | 8/2018 | Chandramouli et al. |
| 2018/0227873 | A1 | 8/2018 | Vrzic et al. |
| 2018/0254094 | A1 | 9/2018 | Ohad et al. |
| 2018/0376384 | A1* | 12/2018 | Youn ............... H04W 36/14 |
| 2019/0029065 | A1 | 1/2019 | Park et al. |
| 2019/0098537 | A1 | 3/2019 | Qiao et al. |
| 2019/0104447 | A1 | 4/2019 | Horn et al. |
| 2019/0116521 | A1 | 4/2019 | Qiao et al. |
| 2019/0141523 | A1 | 5/2019 | Ben Henda et al. |
| 2019/0141584 | A1* | 5/2019 | Ben Henda ......... H04W 12/041 |
| 2019/0159025 | A1 | 5/2019 | Ben Henda et al. |
| 2019/0254094 | A1 | 8/2019 | Babu et al. |
| 2019/0268753 | A1* | 8/2019 | Chen ............... H04W 12/0471 |
| 2019/0289672 | A1* | 9/2019 | Ben Henda ......... H04W 12/041 |
| 2019/0335534 | A1* | 10/2019 | Atarius ................ H04M 15/66 |
| 2019/0387401 | A1* | 12/2019 | Liao ........................ H04W 4/08 |
| 2019/0394651 | A1 | 12/2019 | Wifvesson et al. |
| 2020/0053617 | A1 | 2/2020 | Park et al. |
| 2020/0128402 | A1 | 4/2020 | Niemi et al. |
| 2020/0396587 | A1* | 12/2020 | Kim ........................ H04W 8/08 |
| 2022/0053449 | A1* | 2/2022 | Shan ...................... H04W 4/46 |
| 2022/0070968 | A1* | 3/2022 | Velev .................... H04W 76/32 |
| 2022/0095260 | A1* | 3/2022 | Shan ...................... H04W 60/04 |

FOREIGN PATENT DOCUMENTS

| | | |
|---|---|---|
| CN | 109587688 A | 4/2019 |
| EP | 3462760 A1 | 4/2019 |
| RU | 2541110 C2 | 2/2015 |
| RU | 2630175 C2 | 9/2017 |
| WO | 2018138348 A1 | 8/2018 |
| WO | 2018138379 A1 | 8/2018 |
| WO | 2018138381 A1 | 8/2018 |
| WO | 2018194971 A1 | 10/2018 |
| WO | 2019011751 A1 | 1/2019 |
| WO | 2019063098 A1 | 4/2019 |

OTHER PUBLICATIONS

ZTE , "UE Context Transfer Reason," 3GPP TSG CT WG4 #86bis C4-187046, Vilnius, Republic of Lithuania, Oct. 15-19, 2018, 28 pages.

Huawei et al., "Default S-NSSAI correction and NSSF service update," 3GPP TSG SA WG2 #128BIS S2-188755 , Aug. 20-24, 2018, Sophia Antipolis, France, 9 pages.

3GPP TS 29.518 V5.1.0 "3rd Generation Partnership Project; Technical Specification Group Core Network and Terminals; 5G System; Access and Mobility Management Services; Stage 3 (Release 15)," Sep. 2018, 173 pages.

Huawei, et al., "Security context transfer following the handover from EPS to 5GS," 3GPP TSG-SA WG3 Meeting #95BIS S3-192998 Wroclaw , PL, Aug. 26-30, 2019, 5 pages.

Huawei et al., "Security context transfer following the handover from EPS to 5GS", 3GPP TSG-SA WG3 Meeting #95BIS, S3-192683, Aug. 26-30, 2019, 5 pages.

Huawei et al., "Clafication on retrievial of the security context from old AMF", 3GPP TSG-WG2 Meeting #128, S2-187381, Jul. 2-6, 2018, 9 pages.

3GPP TS 33.401 V8.1.1 (Oct. 2008), "3rd Generation Partnership Project; Technical Specification Group Services and System Aspects; 3GPP System Architecture Evolution (SAE); Security architecture(Release 8)," Oct. 2008, 54 pages.

3GPP TS 33.501 V15.4.0 (Mar. 2019), "3rd Generation Partnership Project; Technical Specification Group Services and System Aspects; Security architecture and procedures for 5G system (Release 15)," Mar. 2019, 187 pages.

Huawei et al., "Clafication on retrievial of the security context from old AMF", 3GPP TSG-WG2 Meeting #128, S2-187367, Jul. 2-6, 2018, 7 pages.

Prasad, A., et al., "3GPP 5G Security," Journal of ICT Standardization vol. 6.1&2, 2018, pp. 137-158.

"3rd Generation Partnership Project; Technical Specification Group Services and System Aspects; Security architecture and procedures for 5G system; (Release 15)," 3GPP TS 33.501, V15.4.0, Mar. 2019, 187 pages.

* cited by examiner

SECURITY CONTEXT OBTAINING METHOD AND APPARATUS, AND COMMUNICATIONS SYSTEM

CROSS-REFERENCE TO RELATED APPLICATIONS

This application is a continuation of U.S. patent application Ser. No. 17/114,812, filed on Dec. 8, 2020, which is a continuation of International Patent Application No. PCT/CN2020/089621, filed on May 11, 2020, which claims priority to Chinese Patent Application No. 201910470895.8, filed on May 31, 2019. The disclosures of the aforementioned applications are hereby incorporated by reference in their entireties.

TECHNICAL FIELD

The present disclosure relates to the communications field, and more specifically, to a security context obtaining method and apparatus, and a communications system.

BACKGROUND

In a 5th generation (5G) communication scenario, because of movement of a user equipment (UE), a network device serving the user equipment changes. In a possible handover scenario, the user equipment is handed over from a 4th generation (4G) communications system to a 5G communications system. In this handover scenario, the user equipment is handed over from a 4G access network device to a 5G access network device, and from a 4G core network device to a 5G core network device. The handover between the core network devices includes handover between core network elements that provide a mobility management service for the user equipment, in other words, handover from a mobility management entity (MME) in the 4G communications system to an access and mobility management function (AMF) in the 5G communications system.

In an existing scenario in which the user equipment is handed over from the 4G communications system to the 5G communications system, in addition to an AMF (a first AMF) selected by an MME, the 5G communications system further includes an AMF (a second AMF) that stores a security context of the user equipment. In this case, how the first AMF obtains the security context of the user equipment from the second AMF becomes an urgent problem to be resolved.

SUMMARY

This application provides a security context obtaining method and apparatus, and a communications system. A second registration request message sent by a first AMF to a second AMF is integrity protected based on a native security context between a user equipment and the second AMF. As such, the second AMF can validate integrity of the second registration request message based on the native security context between the user equipment and the second AMF, to improve a possibility that the second AMF successfully validates the second registration request message. If the validation is successful, the first AMF can successfully obtain a security context of the user equipment from the second AMF.

According to a first aspect, a security context obtaining method is provided. The method includes: A first AMF receives a first registration request message sent by a user equipment, where the first registration request message carries a second registration request message, the second registration request message is integrity protected using a first security context, the first security context is a native security context between the user equipment and a second AMF, and the first AMF is an AMF providing an access and mobility management service for the user equipment after the user equipment is handed over from a 4G communications system to a 5G communications system. The first AMF sends the second registration request message to the second AMF. The second AMF validates integrity of the second registration request message. If the second AMF successfully validates the integrity of the second registration request message, the second AMF sends a security context of the user equipment to the first AMF.

According to the security context obtaining method provided in this embodiment of this application, when the user equipment is handed over from the 4G communications system to the 5G communications system, the security context of the user equipment is stored by the user equipment and the second AMF before the handover. After the user equipment is handed over from the 4G communications system to the 5G communications system, the first AMF provides the access and mobility management service for the user equipment. The first AMF needs to obtain the security context of the user equipment from the second AMF. For example, after receiving a handover command, the user equipment may perform integrity protection on a fourth registration request message based on the natively stored security context between the user equipment and the second AMF, generate the second registration request message, add the second registration request message to the first registration request message, and send the first registration request message to the first AMF. In this way, the first AMF may forward the second registration request message to the second AMF, and the second AMF may validate the integrity of the second registration request message. After successfully validating the integrity of the second registration request message, the second AMF may return the security context of the user equipment to the first AMF. This can improve a possibility that the first AMF successfully obtains the security context of the user equipment from the second AMF.

With reference to the first aspect, in some implementations of the first aspect, the security context of the user equipment includes: the first security context, or a second security context obtained based on the first security context.

According to the security context obtaining method provided in this embodiment of this application, the security context of the user equipment may be the native security context between the user equipment and the second AMF. Alternatively, when the second AMF performs key derivation and generates a new key, the security context of the user equipment may be the second security context generated through key derivation based on the first security context.

With reference to the first aspect, in some implementations of the first aspect, that the first AMF sends the second registration request message to the second AMF includes: The first AMF sends a user equipment context transfer service invoking request to the second AMF, where the user equipment context transfer service invoking request carries the second registration request message.

According to the security context obtaining method provided in this embodiment of this application, the second registration request message sent by the first AMF to the second AMF may be carried in the user equipment context transfer service invoking request sent by the first AMF to the second AMF.

With reference to the first aspect, in some implementations of the first aspect, that the second AMF sends the security context of the user equipment to the first AMF includes: The second AMF sends a first response message to the first AMF, where the first response message carries the security context of the user equipment.

According to the security context obtaining method provided in this embodiment of this application, when returning the security context of the user equipment to the first AMF, the second AMF may send the first response message carrying the security context of the user equipment to the first AMF.

With reference to the first aspect, in some implementations of the first aspect, the method further includes: When the first AMF receives a message indicating that the second AMF fails to validate the integrity of the second registration request message, the first AMF continues to use a mapped security context, or initiates initial authentication to the user equipment.

According to the security context obtaining method provided in this embodiment of this application, when the first AMF fails to obtain the security context of the user equipment from the second AMF, the first AMF may continue to use the mapped security context generated through negotiation with the user equipment; or the first AMF may initiate initial authentication to the user equipment to generate a security context between the first AMF and the user equipment.

With reference to the first aspect, in some implementations of the first aspect, the mapped security context is obtained based on a security context between a mobility management entity (MME) and the user equipment, and the MME is a network element in the 4G communications system.

In the security context obtaining method provided in this embodiment of this application, the mapped security context is a security context generated by the user equipment and the first AMF separately through derivation based on the security context between the user equipment and the MME.

With reference to the first aspect, in some implementations of the first aspect, that the second AMF validates the integrity of the second registration request message includes: The second AMF validates the integrity of the second registration request message based on the native security context between the second AMF and the user equipment.

According to a second aspect, a security context obtaining method is provided. The method includes: A second AMF receives a second registration request message sent by a first AMF, where the second registration request message is integrity protected using a first security context, the first security context is a native security context between a user equipment and the second AMF, and the first AMF is an AMF providing an access and mobility management service for the user equipment after the user equipment is handed over from a 4G communications system to a 5G communications system. The second AMF validates integrity of the second registration request message. If the second AMF successfully validates the integrity of the second registration request message, the second AMF sends a security context of the user equipment to the first AMF.

According to the security context obtaining method provided in this embodiment of this application, when the user equipment is handed over from the 4G communications system to the 5G communications system, the security context of the user equipment is stored by the user equipment and the second AMF before the handover. After the user equipment is handed over from the 4G communications system to the 5G communications system, the first AMF provides the access and mobility management service for the user equipment. The first AMF needs to obtain the security context of the user equipment from the second AMF. For example, after receiving a handover command, the user equipment may perform integrity protection on a fourth registration request message based on the natively stored security context between the user equipment and the second AMF, and then generate the second registration request message. The UE adds the second registration request message to a first registration request message sent to the first AMF. In this way, the first AMF may forward the second registration request message to the second AMF, and the second AMF may validate the integrity of the second registration request message. After successfully validating the integrity of the second registration request message, the second AMF sends the security context of the user equipment to the first AMF. This can improve a possibility that the first AMF successfully obtains the security context of the user equipment from the second AMF.

With reference to the second aspect, in some implementations of the second aspect, the security context of the user equipment includes: the first security context, or a second security context generated through key derivation based on the first security context.

According to the security context obtaining method provided in this embodiment of this application, the security context of the user equipment may be the native security context between the user equipment and the second AMF. Alternatively, when the second AMF performs key derivation and generates a new key, the security context of the user equipment may be the second security context generated through key derivation based on the first security context.

With reference to the second aspect, in some implementations of the second aspect, that the second AMF receives the second registration request message sent by the first AMF includes: The second AMF receives a user equipment context transfer service invoking request sent by the first AMF, where the user equipment context transfer service invoking request carries the second registration request message.

According to the security context obtaining method provided in this embodiment of this application, the second registration request message sent by the first AMF to the second AMF may be carried in the user equipment context transfer service invoking request sent by the first AMF to the second AMF.

With reference to the second aspect, in some implementations of the second aspect, that the second AMF sends the security context of the user equipment to the first AMF includes: The second AMF sends a first response message to the first AMF, where the first response message carries the security context of the user equipment.

According to the security context obtaining method provided in this embodiment of this application, when returning the security context of the user equipment to the first AMF, the second AMF may send the first response message carrying the security context of the user equipment to the first AMF.

With reference to the second aspect, in some implementations of the second aspect, that the second AMF validates the integrity of the second registration request message includes: The second AMF validates the integrity of the second registration request message based on the first security context.

According to a third aspect, a security context obtaining method is provided. The method includes: a user equipment determines a second registration request message, and performs integrity protection on the second registration request message, where the second registration request message is integrity protected using a first security context, and the first security context is a native security context between the user equipment and a second AMF. The user equipment sends a first registration request message to a first AMF, where the first registration request message carries the second registration request message, and the first AMF is an AMF providing an access and mobility management service for the user equipment after the user equipment is handed over from a 4G communications system to a 5G communications system.

According to the security context obtaining method provided in this embodiment of this application, when the user equipment is handed over from the 4G communications system to the 5G communications system, a security context of the user equipment is stored by the user equipment and the second AMF before the handover. After the user equipment is handed over from the 4G communications system to the 5G communications system, the first AMF provides the access and mobility management service for the user equipment. The first AMF needs to obtain the security context of the user equipment from the second AMF. For example, after receiving a handover command, the user equipment may perform integrity protection on a fourth registration request message based on the natively stored security context between the user equipment and the second AMF, and then generate the second registration request message. The UE adds the second registration request message to the first registration request message sent to the first AMF. In this way, the first AMF may forward the second registration request message to the second AMF, and the second AMF may validate integrity of the second registration request message. After successfully validating the integrity of the second registration request message, the second AMF may return the security context of the user equipment to the first AMF. This can improve a possibility that the first AMF successfully obtains the security context of the user equipment from the second AMF.

With reference to the third aspect, in some implementations of the third aspect, the method further includes: if a non-access stratum (NAS) security mode command (SMC) message sent by the first AMF is received, validating integrity of the NAS SMC; and if the validation is successful, sending a non-access stratum security mode complete message to the first AMF.

According to the security context obtaining method provided in this embodiment of this application, if the user equipment receives the NAS SMC message sent by the first AMF, and the user equipment successfully validates the NAS SMC message, the user equipment sends the non-access stratum security mode complete message to the first AMF.

According to a fourth aspect, a security context obtaining method is provided. The method includes: A first AMF receives a first registration request message sent by a user equipment, where the first registration request message carries a second registration request message, the second registration request message is integrity protected using a first security context, the first security context is a native security context between the user equipment and a second AMF, and the first AMF is an AMF providing an access and mobility management service for the user equipment after the user equipment is handed over from a 4G communications system to a 5G communications system. The first AMF sends the second registration request message to the second AMF. If the second AMF successfully validates integrity of the second registration request message, the first AMF receives a security context of the user equipment that is sent by the second AMF.

According to the security context obtaining method provided in this embodiment of this application, when the user equipment is handed over from the 4G communications system to the 5G communications system, the security context of the user equipment is stored by the user equipment and the second AMF before the handover. After the user equipment is handed over from the 4G communications system to the 5G communications system, the first AMF provides the access and mobility management service for the user equipment. The first AMF needs to obtain the security context of the user equipment from the second AMF. For example, after receiving a handover command, the user equipment may perform integrity protection on a fourth registration request message based on the natively stored security context between the user equipment and the second AMF, and then generate the second registration request message. The UE adds the second registration request message to the first registration request message sent to the first AMF. In this way, the first AMF may forward the second registration request message to the second AMF, and the second AMF may validate the integrity of the second registration request message. After successfully validating the integrity of the second registration request message, the second AMF may return the security context of the user equipment to the first AMF. This can improve a possibility that the first AMF successfully obtains the security context of the user equipment from the second AMF.

With reference to the fourth aspect, in some implementations of the fourth aspect, the security context of the user equipment includes: the first security context, or a second security context generated through key derivation based on the first security context.

According to the security context obtaining method provided in this embodiment of this application, the security context of the user equipment may be the native security context between the user equipment and the second AMF. Alternatively, when the second AMF performs key derivation and generates a new key, the security context of the user equipment may be the second security context generated through key derivation based on the first security context.

With reference to the fourth aspect, in some implementations of the fourth aspect, that the first AMF sends the second registration request message to the second AMF includes: The first AMF sends a user equipment context transfer service invoking request to the second AMF, where the user equipment context transfer service invoking request carries the second registration request message.

According to the security context obtaining method provided in this embodiment of this application, the second registration request message sent by the first AMF to the second AMF may be carried in the user equipment context transfer service invoking request sent by the first AMF to the second AMF.

With reference to the fourth aspect, in some implementations of the fourth aspect, that the first AMF receives the security context of the user equipment that is sent by the second AMF includes: The first AMF receives a first response message sent by the second AMF, where the first response message carries the security context of the user equipment.

According to the security context obtaining method provided in this embodiment of this application, when returning the security context of the user equipment to the first AMF, the second AMF may send the first response message carrying the security context of the user equipment to the first AMF.

With reference to the fourth aspect, in some implementations of the fourth aspect, the method further includes: When the first AMF receives a message indicating that the second AMF fails to validate the integrity of the second registration request message, the first AMF continues to use a mapped security context, or initiates initial authentication to the user equipment.

According to the security context obtaining method provided in this embodiment of this application, when the first AMF fails to obtain the security context of the user equipment from the second AMF, the first AMF may continue to use the mapped security context generated through negotiation with the user equipment; or the first AMF may initiate initial authentication to the user equipment to generate a security context between the first AMF and the user equipment.

With reference to the fourth aspect, in some implementations of the fourth aspect, the mapped security context is obtained based on a security context between an MME and the user equipment, and the MME is a network element in the 4G communications system.

In the security context obtaining method provided in this embodiment of this application, the mapped security context is a security context generated by the user equipment and the first AMF separately through derivation based on the security context between the user equipment and the MME.

According to a fifth aspect, a security context obtaining method is provided. The method includes: A first AMF sends a user equipment context transfer service invoking request to a second AMF, where the user equipment context transfer service invoking request is used to obtain a security context of a user equipment, the user equipment context transfer service invoking request carries indication information, the indication information is used to indicate that the user equipment is validated, and the first AMF is an AMF providing an access and mobility management service for the user equipment after the user equipment is handed over from a 4G communications system to a 5G communications system. The first AMF receives a second response message sent by the second AMF, where the second response message carries the security context of the user equipment.

According to the security context obtaining method provided in this embodiment of this application, the user equipment context transfer service invoking request sent by the first AMF to the second AMF carries the indication information indicating that the UE is validated. This can avoid that the second AMF fails to verify the UE and does not send the security context of the UE to the first AMF, and improve a possibility that the first AMF successfully obtains the security context of the user equipment from the second AMF.

With reference to the fifth aspect, in some implementations of the fifth aspect, that the indication information is used to indicate that the user equipment is validated includes: The indication information is used to indicate that integrity of a registration request message is successfully validated, where the registration request message is received by the first AMF from the user equipment.

According to the security context obtaining method provided in this embodiment of this application, the indication information, sent by the first AMF to the second AMF, indicating that the UE is validated may be used by the first AMF to notify the second AMF that the integrity of the registration request message sent by the UE is successfully validated. This provides a flexible optional solution for indicating that the UE is validated.

With reference to the fifth aspect, in some implementations of the fifth aspect, before the first AMF sends the user equipment context transfer service invoking request to the second AMF, the method further includes: The first AMF successfully validates integrity protection for the registration request message, where the registration request message is received by the first AMF from the user equipment; and/or the first AMF determines that the registration request message is a registration request message sent by the user equipment after the user equipment is handed over from the 4G communications system to the 5G communications system.

According to the security context obtaining method provided in this embodiment of this application, the first AMF determines, based on a result indicating that the registration request message is successfully validated and/or based on that the received registration request message is the registration request message sent by the user equipment after the user equipment is handed over from the 4G communications system to the 5G communications system, that the user equipment context transfer service invoking request may be sent to the second AMF.

With reference to the fifth aspect, in some implementations of the fifth aspect, the user equipment context transfer service invoking request carries an identity of the user equipment.

According to the security context obtaining method provided in this embodiment of this application, to enable the second AMF to learn that the first AMF needs to obtain a security context of user equipment, the first AMF adds an identity of the user equipment to the context transfer service invoking request.

With reference to the fifth aspect, in some implementations of the fifth aspect, the user equipment context transfer service invoking request carries an uplink (UL) NAS count of the user equipment.

According to the security context obtaining method provided in this embodiment of this application, to enable the second AMF to learn of the UL NAS COUNT, the first AMF may add the UL NAS COUNT to the context transfer service invoking request.

With reference to the fifth aspect, in some implementations of the fifth aspect, that the user equipment context transfer service invoking request carries the UL NAS COUNT includes: The user equipment context transfer service invoking request carries a plaintext registration request message, where the plaintext registration request message includes the UL NAS COUNT, and the registration request message is received by the first AMF from the user equipment.

According to the security context obtaining method provided in this embodiment of this application, that the user equipment context transfer service invoking request carries the UL NAS COUNT may be implemented by carrying the plaintext registration request message in the user equipment context transfer service invoking request, where the plaintext registration request message includes the UL NAS COUNT. This provides a flexible optional solution for the first AMF to send the UL NAS COUNT to the second AMF.

According to a sixth aspect, a security context obtaining method is provided. The method includes: A second AMF receives a user equipment context transfer service invoking request sent by a first AMF, where the user equipment context transfer service invoking request is used to obtain a security context of a user equipment, the user equipment context transfer service invoking request carries indication information, the indication information is used to indicate that the user equipment is validated, and the first AMF is an AMF providing an access and mobility management service for the user equipment after the user equipment is handed over from a 4G communications system to a 5G communications system. The second AMF sends a second response message to the first AMF, where the second response message carries the security context of the user equipment.

According to the security context obtaining method provided in this embodiment of this application, the user equipment context transfer service invoking request sent by the first AMF and received by the second AMF carries the indication information indicating that the UE is validated. Based on the indication information, the second AMF does not need to verify the UE. This can avoid that the second AMF fails to verify the UE and does not send the security context of the UE to the first AMF, and improve a possibility that the first AMF successfully obtains the security context of the user equipment from the second AMF.

With reference to the sixth aspect, in some implementations of the sixth aspect, that the indication information is used to indicate that the user equipment is validated includes: The indication information is used to indicate that integrity of a registration request message is successfully validated, where the registration request message is received by the first AMF from the user equipment.

According to the security context obtaining method provided in this embodiment of this application, the indication information, sent by the first AMF and received by the second AMF, indicating that the UE is validated may be used by the first AMF to notify the second AMF that the integrity of the registration request message sent by the UE is successfully validated. This provides a flexible optional solution for indicating that the UE is validated.

With reference to the sixth aspect, in some implementations of the sixth aspect, the user equipment context transfer service invoking request carries an identity of the user equipment.

According to the security context obtaining method provided in this embodiment of this application, based on the identity of the user equipment that is carried in the context transfer service invoking request, the second AMF may determine that the first AMF needs to obtain the security context of the user equipment.

With reference to the sixth aspect, in some implementations of the sixth aspect, the user equipment context transfer service invoking request carries an UL NAS count of the user equipment.

According to the security context obtaining method provided in this embodiment of this application, the second AMF may learn of the UL NAS COUNT based on the UL NAS COUNT carried in the context transfer service invoking request.

With reference to the sixth aspect, in some implementations of the sixth aspect, that the user equipment context transfer service invoking request carries the UL NAS COUNT includes: The user equipment context transfer service invoking request carries a plaintext registration request message, where the plaintext registration request message includes the UL NAS COUNT, and the registration request message is received by the first AMF from the user equipment.

According to the security context obtaining method provided in this embodiment of this application, that the user equipment context transfer service invoking request carries the UL NAS COUNT may be implemented by carrying the plaintext registration request message in the user equipment context transfer service invoking request, where the plaintext registration request message includes the UL NAS COUNT. This provides a flexible optional solution for the first AMF to send the UL NAS COUNT to the second AMF.

With reference to the sixth aspect, in some implementations of the sixth aspect, the method further includes: The second AMF performs key derivation based on the ULNAS COUNT.

According to the security context obtaining method provided in this embodiment of this application, the second AMF may perform key derivation based on the received UL NAS COUNT.

According to a seventh aspect, a communications system is provided. The communications system includes the first AMF and the second AMF that may be configured to perform operations performed by the first AMF and the second AMF in any one of the first aspect or the possible implementations of the first aspect. For example, the communications apparatus may include a corresponding component (means) configured to perform the steps or functions described in any one of the first aspect or the possible implementations of the first aspect, and the component may be the first AMF and the second AMF in the first aspect, or chips or functional modules inside the first AMF and the second AMF in the first aspect. The steps or functions may be implemented by software, hardware, or a combination of hardware and software.

According to an eighth aspect, a security context obtaining apparatus is provided. The apparatus may be configured to perform an operation performed by the first AMF in any one of the fifth aspect, the fourth aspect, the possible implementations of the fifth aspect, or the possible implementations of the fourth aspect. For example, the security context obtaining apparatus may include a corresponding component (means) configured to perform the steps or functions described in any one of the fifth aspect, the fourth aspect, the possible implementations of the fifth aspect, or the possible implementations of the fourth aspect, and the component may be the first AMF in the fourth and fifth aspects, or a chip or a functional module inside the first AMF in the fourth and fifth aspects. The steps or functions may be implemented by software, hardware, or a combination of hardware and software.

According to a ninth aspect, a security context obtaining apparatus is provided. The apparatus may be configured to perform an operation performed by the second AMF in any one of the second aspect, the sixth aspect, the possible implementations of the second aspect, or the possible implementations of the sixth aspect. For example, the security context obtaining apparatus may include a corresponding component (means) configured to perform the steps or functions described in any one of the second aspect, the sixth aspect, the possible implementations of the second aspect, or the possible implementations of the sixth aspect, and the component may be the second AMF in the second and sixth aspects, or a chip or a functional module in the second AMF in the second and sixth aspects. The steps or functions may be implemented by software, hardware, or a combination of hardware and software.

According to a tenth aspect, a security context obtaining apparatus is provided. The apparatus may be configured to perform an operation performed by the user equipment in the third aspect. For example, the security context obtaining apparatus may include a corresponding component (means) configured to perform the steps or functions described in the third aspect, and the component may be the user equipment in the third aspect, or a chip or a functional module in the user equipment in the third aspect. The steps or functions may be implemented by software, hardware, or a combination of hardware and software.

According to an eleventh aspect, a communications device is provided, including a processor, a transceiver, and a memory. The memory is configured to store a computer program. The transceiver is configured to perform sending and receiving steps in the security context obtaining method in any possible implementation in the first to the fifth aspects. The processor is configured to invoke the computer program from the memory and run the computer program, to enable the communications device to perform the security context obtaining apparatus method in any possible implementation in the first to the sixth aspects.

Optionally, there are one or more processors and one or more memories.

Optionally, the memory may be integrated with the processor, or the memory and the processor may be separately disposed.

Optionally, the transceiver includes a transmitter and a receiver.

According to a twelfth aspect, a system is provided. The system includes the security context obtaining apparatuses provided in the eighth aspect and the ninth aspect.

According to a thirteenth aspect, a computer program product is provided. The computer program product includes a computer program (which may also be referred to as code or an instruction). When the computer program is run, a computer is enabled to perform the method in any possible implementation in the first to the sixth aspects.

According to a fourteenth aspect, a computer-readable medium is provided. The computer-readable medium stores a computer program (which may also be referred to as code or an instruction). When the computer program is run on a computer, the computer is enabled to perform the method in any possible implementation in the first to the sixth aspects.

According to a fifteenth aspect, a chip system is provided, including a memory and a processor. The memory is configured to store a computer program. The processor is configured to invoke the computer program from the memory and run the computer program, such that a communications device on which the chip system is installed performs the method in any possible implementation in the first to the sixth aspects.

DESCRIPTION OF EMBODIMENTS

The following describes technical solutions of this application with reference to accompanying drawings.

The technical solutions of the embodiments of this application may be applied to various communications systems, such as a global system for mobile communications (GSM), a code-division multiple access (CDMA) system, a wide-band CDMA (WCDMA) system, a General Packet Radio Service (GPRS) system, a Long-Term Evolution (LTE) system, an LTE frequency-division duplex (FDD) system, an LTE time-division duplex (TDD) system, a Universal Mobile Telecommunications System (UMTS), a Worldwide Interoperability for Microwave Access (WiMAX) communications system, a future 5th generation (5G) system, or a new radio (NR) system.

Figure 1:
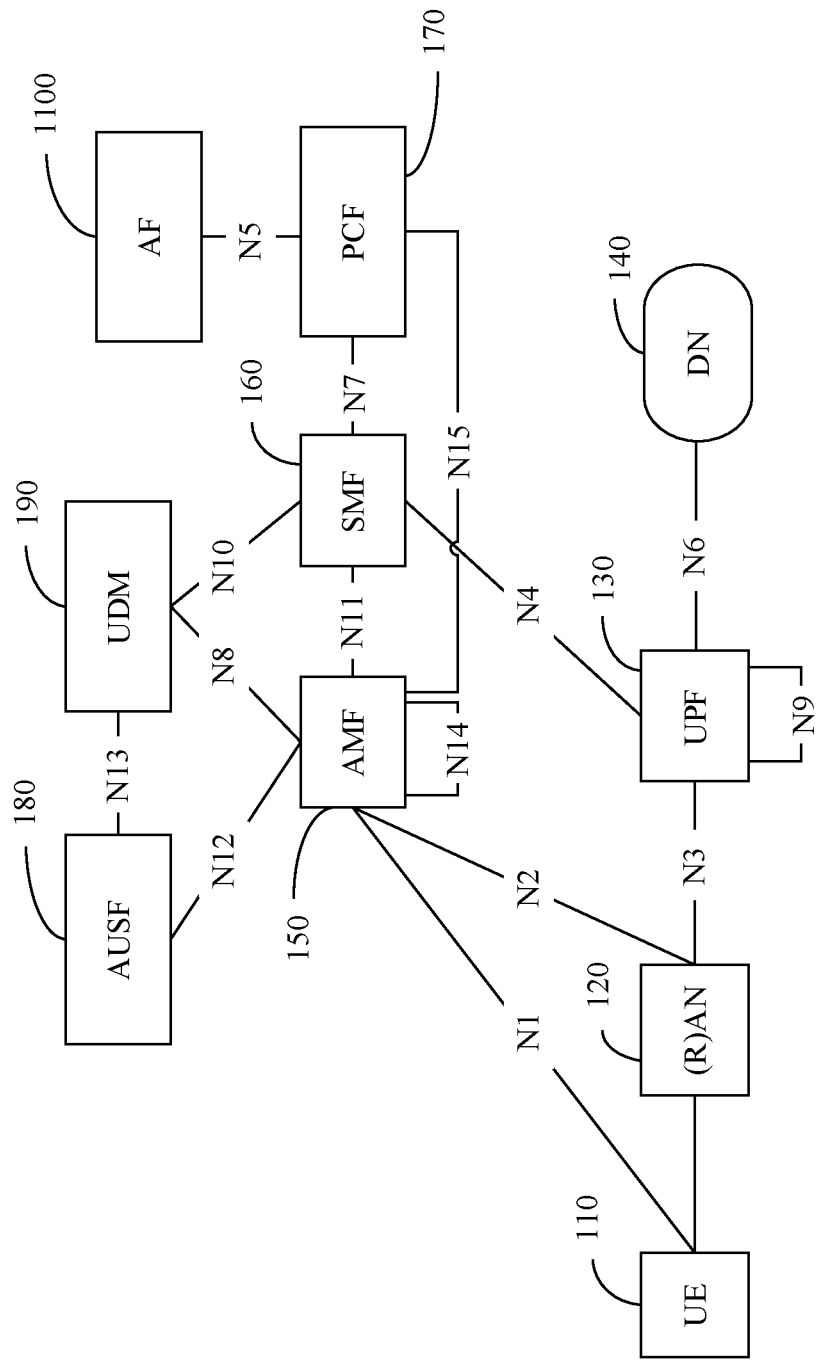
FIG. 1 is a network architecture applicable to embodiments of this application.

FIG. 1 is a network architecture applicable to the embodiments of this application. As shown in FIG. 1, the following separately describes components in the network architecture.

1. User equipment (UE) 110 may include various hand-held devices, vehicle-mounted devices, wearable devices, and computing devices that have a wireless communication function, or other processing devices connected to a wireless modem, and various forms of terminals, mobile stations (MS), terminals, soft clients, and the like. For example, the user equipment 110 may be a water meter, an electricity meter, or a sensor.

2. A (radio) access network ((R)AN) element 120 is configured to provide a network access function for authorized user equipments in a specific area, and can use transmission tunnels with different quality based on levels, service requirements, and the like of the user equipments.

The (R)AN element can manage radio resources and provide an access service for user equipment, to forward a control signal and user equipment data between the user equipment and a core network. The (R)AN element may also be understood as a base station in a conventional network.

3. A user plane network element 130 is used for packet routing and forwarding, quality of service (QoS) processing of user plane data, and the like.

In a 5G communications system, the user plane network element may be a user plane function (UPF) network element. In a future communications system, the user plane network element may still be a UPF network element, or may have another name. This is not limited in this application.

4. A data network element 140 is configured to provide a network for data transmission.

In the 5G communications system, the data network element may be a data network (DN) element. In the future communications system, the data network element may still be a DN element, or may have another name. This is not limited in this application.

5. An access and mobility management network element 150 is mainly configured to perform mobility management, access management, and the like. The access and mobility management network element 150 may be configured to implement functions, for example, lawful interception and access authorization/authentication, other than session management in functions of a mobility management entity (MIME).

In the 5G communications system, the access and mobility management network element may be an access and mobility management function (AMF). In the future communications system, the access and mobility management device may still be an AMF, or may have another name. This is not limited in this application.

6. A session management network element 160 is mainly configured to manage a session, assign and manage an Internet Protocol (IP) address of a user equipment, select an endpoint that can manage a user plane function interface and a policy control and charging function interface, notify downlink data, and the like.

In the 5G communications system, the session management network element may be a session management function (SMF) network element. In the future communications system, the session management network element may still be an SMF network element, or may have another name. This is not limited in this application.

7. A policy control network element 170 is configured to guide a unified policy framework of network behavior, and provide policy rule information for a control plane function network element (such as the AMF or the SMF network element), and the like.

In a 4G communications system, the policy control network element may be a policy and charging rules function (PCRF) network element. In the 5G communications system, the policy control network element may be a policy control function (PCF) network element. In the future communications system, the policy control network element may still be a PCF network element, or may have another name. This is not limited in this application.

8. An authentication server 180 is configured to authenticate a service, generate a key to implement two-way authentication for user equipment, and support a unified authentication framework.

In the 5G communications system, the authentication server may be an authentication server function (AUSF) network element. In the future communications system, the authentication server function network element may still be an AUSF network element, or may have another name. This is not limited in this application.

9. A data management network element 190 is configured to process a user equipment identity, perform access authentication, registration, and mobility management, and the like.

In the 5G communications system, the data management network element may be a unified data management (UDM) network element. In the 4G communications system, the data management network element may be a home subscriber server (HSS) network element. In the future communications system, the unified data management may still be a UDM network element, or may have another name. This is not limited in this application.

10. An application network element 1100 is configured to perform application-affected data routing, access a network exposure function network element, interact with a policy framework to perform policy control, and the like.

In the 5G communications system, the application network element may be an application function (AF) network element. In the future communications system, the application network element may still be an AF network element, or may have another name. This is not limited in this application.

11. A network storage network element is configured to maintain real-time information of all network function services in a network.

In the 5G communications system, the network storage network element may be a network repository function (NRF) network element. In the future communications system, the network storage network element may still be an NRF network element, or may have another name. This is not limited in this application.

It may be understood that the foregoing network elements or functions may be network elements in a hardware device, software functions running on dedicated hardware, or virtualized functions instantiated on a platform (for example, a cloud platform). For ease of description, this application is described below using an example in which the access and mobility management device is the AMF, the data management network element is the UDM network element, the session management network element is the SMF network element, and the user plane network element is the UPF network element.

For ease of description, in the embodiments of this application, a session establishment method is described using an example in which an apparatus is an AMF entity or a UDM entity. For an implementation method in which the apparatus is a chip in an AMF entity or a chip in a UDM entity, refer to descriptions about the session establishment method in which the apparatus is the AMF entity or the UDM entity. Details are not repeated.

In the network architecture shown in FIG. 1, the user equipment is connected to the AMF through an N1 interface, the (R)AN is connected to the AMF through an N2 interface, and the (R)AN is connected to the UPF through an N3 interface. UPFs are connected to each other through an N9 interface, and the UPF is interconnected to a DN through an N6 interface. The SMF controls the UPF through an N4 interface. The AMF is connected to the SMF through an N11 interface. The AMF obtains subscription data of the user equipment from a UDM unit through an N8 interface. The SMF obtains the subscription data of the user equipment from the UDM unit through an N10 interface.

It should be understood that the foregoing network architecture applied to the embodiments of this application is merely an example, and a network architecture applicable to the embodiments of this application is not limited thereto. Any network architecture that can implement functions of the foregoing network elements is applicable to the embodiments of this application.

For example, in some network architectures, network function network elements and entities such as the AMF, the SMF network element, the PCF network element, a BSF network element, and the UDM network element are all referred to as network function (NF) network elements. Alternatively, in some other network architectures, a set of network elements such as the AMF, the SMF network element, the PCF network element, a BSF network element, and the UDM network element may be referred to as a control plane function network element.

The user equipment in the embodiments of this application may be an access terminal, a subscriber unit, a subscriber station, a mobile station, a mobile console, a relay station, a remote station, a remote terminal, a mobile device, a user terminal, terminal equipment, a terminal, a wireless communications device, a user agent, a user apparatus, or the like. The user equipment may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, user equipment in a future 5G network, user equipment in a future evolved public land mobile network (public land mobile network, PLMN), or the like. This is not limited in the embodiments of this application.

A network device in the embodiments of this application may be any device that has a wireless transceiver function and that is configured to communicate with the user equipment. The device includes but is not limited to an evolved NodeB (eNB), a radio network controller (RNC), a NodeB (NB), a base station controller (BSC), a base transceiver station (BTS), a home base station (for example, a home evolved NodeB, or a home Node B (HNB)), a baseband unit (BBU), an access point (AP) in a wireless fidelity (WIFI) system, a wireless relay node, a wireless backhaul node, a transmission point (TP), a transmission and reception point (TRP), or the like. Alternatively, the device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (DU), that constitutes a gNB or a transmission point.

In some deployments, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (e.g., RAN), or may be a network device in a core network (CN). This is not limited in this application.

In the embodiments of this application, the user equipment or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing using a process, for example, a Linux operating system, a Unix operating system, an Android operating system, an iOS operating system, or a Windows operating system. The application layer includes applications such as a browser, an address book, word processing software, and instant communications software. In addition, a specific structure of an entity for performing a method provided in the embodiments of this application is not particularly limited in the embodiments of this application, provided that a program recording code of the method provided in the embodiments of this application can be run to perform communication according to the method provided in the embodiments of this application. For example, the entity for performing the method provided in the embodiments of this application may be the user equipment or the network device, or may be a functional module capable of invoking and executing the program in the user equipment or the network device.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable storage media" may include but is not limited to a radio channel, and various other media that can store, contain, and/or carry an instruction and/or data.

The embodiments of this application mainly relate to the mobility management entity (MME) when the network architecture shown in FIG. 1 is a 4G network architecture, and the AMF and the UE when the network architecture shown in FIG. 1 is a 5G network architecture. For the AMF, this application relates to a first AMF and a second AMF. For example, the first AMF in this application is an AMF that is selected, from the 5G communications system in a process in which the user equipment is handed over from the 4G communications system to the 5G communications system, for the UE by an MME in the 4G communications system to provide a core network service for the UE. The second AMF in this application is an AMF, other than the first AMF in the 5G communications system in the process in which the user equipment is handed over from the 4G communications system to the 5G communications system, that stores a security context of the UE.

It should be understood that "first" and "second" in this application are merely used for differentiation, and should not be construed as any limitation on this application. For example, the first AMF and the second AMF are merely used to differentiate between different AMFs.

Figure 2:
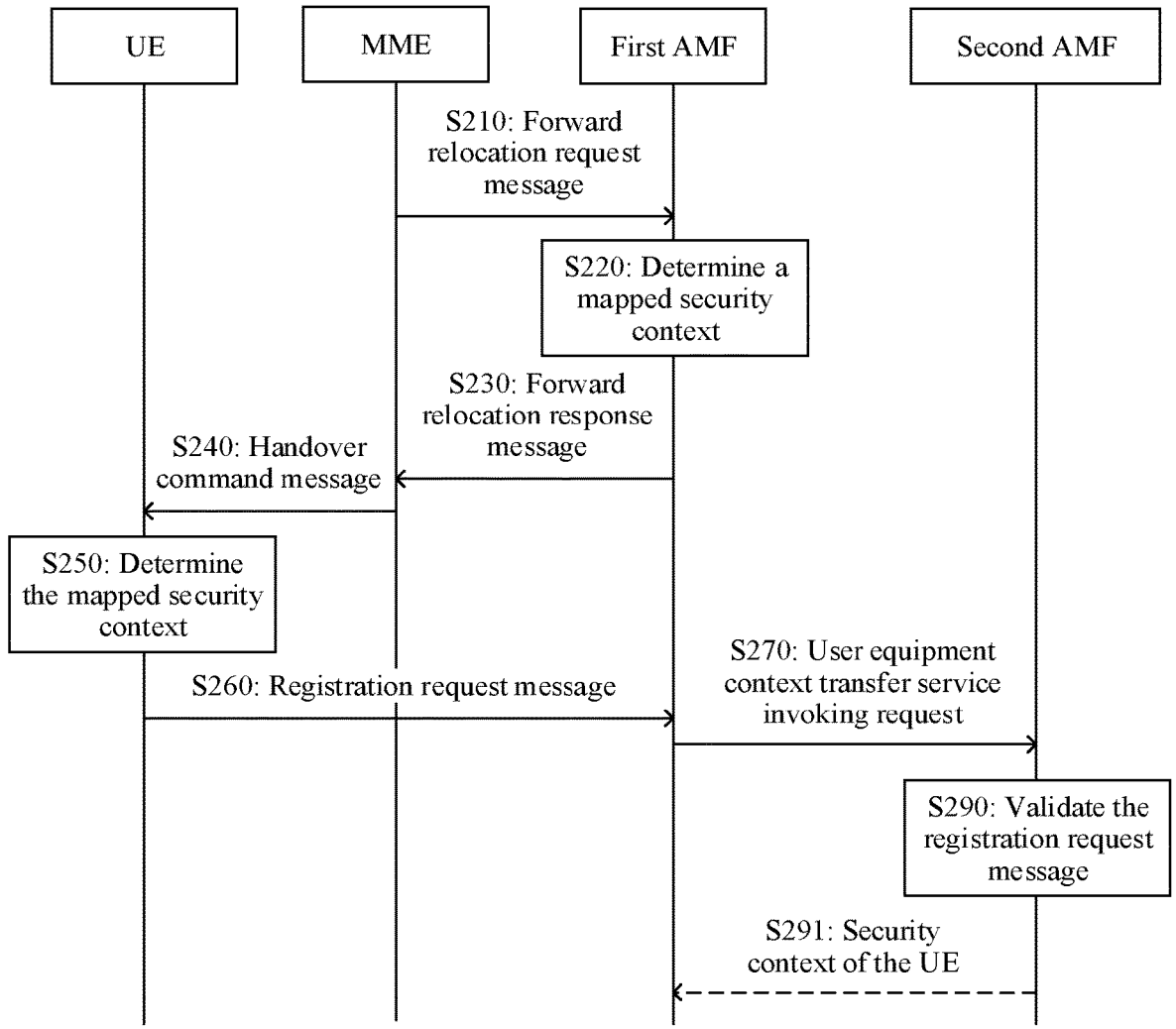
FIG. 2 is a schematic flowchart of handover between communications systems.

To facilitate understanding of a security context obtaining method provided in the embodiments of this application, the following briefly describes, with reference to FIG. 2, a process in which a user equipment is handed over from a 4G communications system to a 5G communications system. FIG. 2 is a schematic flowchart of handover between communications systems. The schematic flowchart includes the UE, an MME, a first AMF, and a second AMF.

The handover between the communications systems includes the following steps.

S210: The MME sends a forward relocation request message to the first AMF.

For example, the MME in the 4G communications system learns that the user equipment is handed over from the 4G communications system to the 5G communications system, and needs to select, for the UE, the first AMF from the 5G communications system to continue to provide an access and mobility management service for the UE. When the UE accesses the 4G communications system, the UE and the MME obtain a same key $K_{ASME}$. When the UE is handed over from the 4G communications system to the 5G communications system, the MME selects the first AMF and sends the $K_{ASME}$ and a next hop (NH) parameter to the first AMF. In other words, the forward relocation request message carries parameters such as the $K_{ASME}$ and the NH.

In this embodiment of this application, how the MME learns of handover between systems is not limited. For details, refer to specifications for a procedure of handover from the 4G communications system to the 5G communications system in an existing protocol. For example, a base station in the 4G communications system may send a handover request to the MME, such that the MME learns that the user equipment needs to be handed over from the 4G communications system to the 5G communications system.

In addition, in this embodiment of this application, how the MME selects the first AMF is not limited. For details, refer to specifications in the existing protocol. For example, the MME stores at least one AMF configured by an operator. When the MME learns that the user equipment needs to be handed over from the 4G communications system to the 5G communications system, the MME selects the first AMF from the at least one AMF.

S220: The first AMF determines a mapped security context.

For example, the first AMF derives the mapped security context based on the parameters, such as the $K_{ASME}$ and the NH, carried in the received relocation request message. The mapped security context is included in a mapped context of the UE. It should be understood that the mapped context in this application is a security context of the UE that is derived by the first AMF and the UE separately based on a context generated through negotiation between the UE and the MME in the 4G communications system. For how to derive the security context of the UE based on the 4G context, refer to specifications in the existing protocol, and this process is not limited in this application. The mapped security context is obtained by the first AMF and the UE separately based on a security context between the MME and the user equipment. In addition, in this application, the context negotiated between the UE and the MME in the 4G communications system includes the security context between the UE and the MME, and may also be referred to as a 4G context of the UE for differentiation. Likewise, in this application, before the UE is handed over from the 4G communications system to the 5G communications system, the security context of the UE that is stored in the UE and the second AMF is a context negotiated between the UE and the second AMF in the 5G communications system, includes a security context between the UE and the second AMF, and may also be referred to as a 5G context of the UE for differentiation.

For ease of description, in the following, the security context obtained by the first AMF and the UE separately through derivation based on the security context between the MME and the user equipment is referred to as the mapped security context, and the security context between the second AMF and the UE is referred to as a native security context.

It should be further understood that this embodiment of this application mainly relates to sending the security context of the UE by the second AMF to the first AMF. The security context of the UE is a part of a context of the UE, and may be transferred along with the context of the UE. Therefore, for ease of description, in this embodiment of this application, sending the security context of the UE by the second AMF to the first AMF may be described as sending the context of the UE or sending the security context of the UE. This is merely used for ease of description, and does not constitute any limitation on the protection scope of the embodiments of this application.

That the first AMF derives the mapped security context of the UE based on the parameters, such as the $K_{ASME}$ and the NH, carried in the received relocation request message includes that the first AMF derives a key $K_{AMF1}$ based on the $K_{ASME}$ and the NH.

For example, after receiving the $K_{ASME}$ and the NH, the first AMF may calculate the key $K_{AMF1}$ using a preset derivation formula. The derivation formula is: $K_{AMF1}$=HMAC-SHA-256 (Key, FC||P0||L0), where FC=0x76, P0=NH value, L0=length of the NH value (i.e. 0x00 0x20), and KEY=$K_{ASME}$. The first AMF calculates an integrity protection key $K_{NASint1}$ and a confidentiality protection key $K_{NASenc1}$ based on the key $K_{AMF1}$ and a security algorithm negotiated with the UE, where $K_{AMF1}$, $K_{NASint1}$, and $K_{NASenc1}$ are included in the security context of the UE. $K_{AMF1}$, $K_{NASint1}$, and $K_{NASenc1}$ are derived based on $K_{ASME}$ and the NH, and $K_{ASME}$, and the NH are the security context between the UE and the MME. Therefore, $K_{AMF1}$, $K_{NASint1}$, and $K_{NASenc1}$ are referred to as the mapped security context of the UE.

S230: The first AMF sends a forward relocation response message to the MME.

For example, after determining the mapped security context, the first AMF sends the forward relocation response message to the MME. The forward relocation response message is used to notify the MME that the first AMF may be used as an AMF providing the access and mobility management service for the UE in the 5G communications system when the UE is handed over from the 4G communications system to the 5G communications system.

S240: The MME sends a handover command message to the UE.

After receiving the forward reallocation response message sent by the first AMF, the MME learns that the first AMF can provide the access and mobility management service for the UE. In this case, the MME sends the handover command message to the UE, such that the UE learns that the UE can be handed over from the 4G communications system to the 5G communications system.

S250: The UE determines the mapped security context.

After receiving the handover command message, the UE calculates, using the preset derivation formula, the key $K_{AMF1}$ based on the key $K_{ASME}$ and the NH that are stored in the UE. For a derivation process, refer to the foregoing S220, and details are not described herein again.

After S250, the UE and the first AMF obtain the same key $K_{AMF1}$, and the key $K_{AMF1}$ may be subsequently used to derive another key.

For example, the UE and the first AMF obtain the same key $K_{AMF1}$. Then, based on $K_{AMF1}$ and a non-access stratum (NAS) integrity protection algorithm and a confidentiality protection algorithm that are negotiated between the UE and the first AMF, the UE and the first AMF generate the integrity protection key $K_{NASint1}$ and the confidentiality protection key $K_{NASenc1}$ that are used to protect an NAS message (for example, a registration request message). For example, $K_{NASint1}$ and $K_{NASenc1}$ are calculated as follows.

$K_{NASint1}$=HMAC-SHA-256 (KEY, S), where S=FC∥P0$_1$∥L0$_1$∥P1$_1$∥L1$_1$, FC=0x69, P0$_1$=algorithm type distinguisher, L0$_1$=length of the algorithm type distinguisher (i.e. 0x00 0x01), P1$_1$=algorithm identity, L1$_1$=length of the algorithm identity (i.e. 0x00 0x01), and KEY=$K_{AMF1}$.

$K_{NASenc1}$=HMAC-SHA-256 (KEY, S), where S=FC∥P0∥L0∥P1∥L1, FC=0x69, P0=algorithm type distinguisher, L0=length of algorithm type distinguisher (i.e. 0x00 0x01), P1=algorithm identity, L1=length of algorithm identity (i.e. 0x00 0x01), and KEY=$K_{AMF1}$.

The algorithm type distinguisher and the algorithm identity for calculating $K_{NASint1}$ are different from those for calculating $K_{NASenc1}$.

After the handover is completed, the UE initiates mobility registration, in other words, performs S260. The UE sends the registration request message to the first AMF, and the UE performs security protection on the registration request message using the mapped security context generated through derivation based on the foregoing generated $K_{AMF1}$. The security protection includes encryption protection and/or integrity protection.

It should be understood that a message sent by the UE to a core network device may be forwarded by an access network device. Because a function of an access device is not limited in this embodiment of this application, the access network device may forward a message between the UE and the first AMF. For brevity, in this application, forwarding the message between the UE and the first AMF is described as that the UE sends the registration request message to the first AMF and the MME sends a message to the UE. The registration request message sent by the UE further includes a globally unique temporary user equipment identity (GUTI) in the mapped context, and the GUTI is used by the access network device to determine to forward the registration request message to the first AMF. Because the GUTI is included in the mapped context, the GUTI may be referred to as a mapped GUTI.

Optionally, when the UE sends the registration request message to the first AMF, the UE stores a security context of the UE that is between the UE and another AMF (the second AMF) and a 5G globally unique temporary user equipment identity (5G-GUTI) of the user equipment. Therefore, the UE adds the 5G-GUTI to the registration request message.

It should be understood that this embodiment of this application mainly relates to a process in which the first AMF successfully obtains the security context of the UE from the second AMF. Therefore, in this application, the following case is mainly considered: When the UE sends the registration request message to the first AMF, the UE stores the security context the UE that is negotiated between the UE and the second AMF as well as the 5G-GUTI.

It should be further understood that a reason why the security context and the 5G-GUTI of the UE are stored by the UE and the second AMF is not limited in this embodiment of this application, and may be specified in the existing protocol. For example, before the UE is handed over from the 4G communications system to the 5G communications system, the UE is handed over from the 5G network communications system to the 4G communications system. Alternatively, UE supporting dual connectivity accesses the 5G communications system through a non-3$^{rd}$ Generation Partnership Project (3GPP) connection, and accesses the 4G communications system through a 3GPP connection at the same time. In this way, the UE in connected mode is handed over from the 4G communications system to the 5G communications system.

It should be understood that when the security context of the UE that is between the second AMF and the UE exists on the second AMF, the first AMF needs to obtain the security context of the UE from the second AMF. For example, that the first AMF obtains the security context of the UE from the second AMF is determined based on the 5G-GUTI carried in the registration request message received from the UE. The 5G-GUTI is configured by the second AMF for the UE and may be used to identify the UE and the second AMF. As specified in a protocol, when a security context of UE exists in the 5G communications system, the security context of the UE instead of a mapped security context determined through negotiation between the first AMF and the UE is preferentially used, because the mapped security context is obtained through mapping based on a security context of the UE that is between the UE and the MME in the 4G communications system. In other words, the procedure shown in FIG. 2 further includes S270 in which the first AMF initiates a user equipment context transfer service invoking request (Namf_Communication_UEContextTransfer).

For example, the first AMF receives the registration request message sent by the UE, and initiates the user equipment context transfer service invoking request to the second AMF based on the 5G-GUTI carried in the registration request message. The user equipment context transfer service invoking request carries the registration request message.

It should be understood that the registration request message is security protected based on the mapped security context between the UE and the first AMF, and the second AMF determines, based on a result of validating the registration request message, whether to return the security context of the UE to the first AMF. In other words, S290 is performed. The second AMF validates the registration request message.

In a possible implementation, the second AMF fails to validate the registration request message. In this case, the second AMF does not return the security context of the UE to the first AMF. Consequently, the first AMF fails to obtain the security context of the UE from the second AMF, and the first AMF cannot preferentially use the security context of the UE. This does not comply with the protocol.

In another possible implementation, the second AMF successfully validates integrity of the registration request message. In this case, the second AMF returns the security context of the UE to the first AMF, and performs S291 in which the second AMF sends the security context of the UE to the first AMF. Optionally, that the second AMF sends the security context of the UE to the first AMF may be described as that the second AMF sends the context of the UE to the first AMF. The context of the UE includes the security context of the UE that is determined through negotiation between the second AMF and the UE, and the security context of the UE includes a key $K_{AMF2}$, an NAS count, and the like.

Optionally, before transferring the security context of the UE, the second AMF may perform key derivation on the key $K_{AMF2}$ according to a local policy. If the second AMF has performed key derivation on $K_{AMF2}$, the second AMF sends, to the first AMF, a key $K_{AMF2}$ obtained after derivation and derivation indication information that is used to indicate that the second AMF has performed key derivation on $K_{AMF2}$.

In a possible implementation, the key derivation in this application may be horizontal key derivation.

For example, a manner of performing horizontal key derivation on $K_{AMF2}$ to generate $K_{AMF2}'$ is as follows:

$K_{AMF2}'$=HMAC-SHA-256 (Key, S);
FC=0x72;
P0=0x01;
L0=length of P0 (i.e. 0x00 0x01);
P1=uplink NAS COUNT;
L1=length of P1 (i.e. 0x00 0x04);
KEY=$K_{AMF2}$;
S=FC||P0||L0||P1||L1.

In another possible implementation, the key derivation in this application may be a key derivation manner agreed on between different network elements. For example, the first AMF and the second AMF agree on a preset key derivation manner. Provided that the security context of the UE that is sent by the second AMF to the first AMF includes the derivation indication information, the first AMF can determine that a key in the received security context of the UE is obtained by the second AMF by performing key derivation in the preset key derivation manner.

Similarly, after receiving the derivation indication information, the first AMF also sends the derivation indication information to the UE, to indicate the UE to perform key derivation on the key $K_{AMF2}$ to obtain the key $K_{AMF2}'$, such that the UE and a network side agree on the key. It should be understood that the UE receives a key identifier indicating the key $K_{AMF2}$, and therefore can determine to perform key derivation on the key $K_{AMF2}$ instead of $K_{AMF}$. The key identifier is not improved in this application. Therefore, the key identifier is not described in detail herein.

It can be learned, from the process of handing over the user equipment from the 4G communications system to the 5G communications system in FIG. 2, that when the second AMF fails to verify the UE, the first AMF cannot obtain the security context of the UE from the second AMF. To avoid failing to obtain the security context of the UE, an embodiment of this application provides a security context obtaining method. When the first AMF obtains the security context of the UE from the second AMF, the security context carries indication information. The indication information indicates that the UE has been successfully verified. Based on the indication information, the second AMF does not need to verify the UE, but directly returns the security context of the UE. This can avoid a possibility of failing to obtain the security context of the UE.

It should be understood that verifying the UE in this application means validating the integrity of the registration request message sent by the UE, for example, decrypting the registration request message and/or validating the integrity of the registration request message. Because a premise that the integrity of the registration request message is successfully validated is that the registration request message is successfully decrypted, in this embodiment of this application, that the UE is successfully verified is described as that the integrity of the registration request message is successfully validated.

Figure 3:
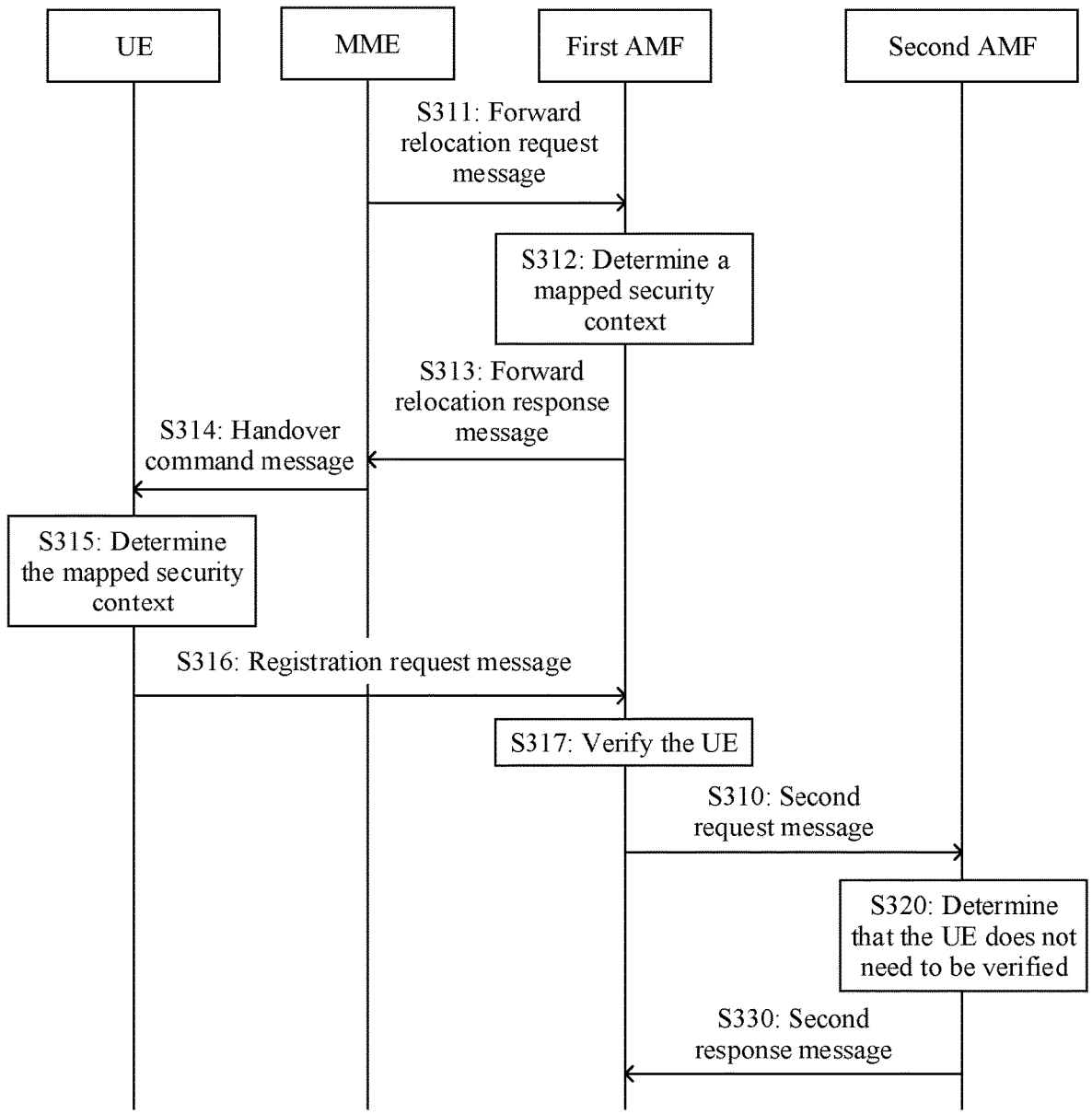
FIG. 3 is a schematic diagram of a security context obtaining method according to an embodiment of this application.

With reference to FIG. 3, the following describes in detail a security context obtaining method provided in an embodiment of this application. FIG. 3 is a schematic diagram of a security context obtaining method according to an embodiment of this application. The schematic diagram includes UE, an MME, a first AMF, and a second AMF.

The security context obtaining method includes the following steps.

S310: The first AMF sends a second request message to the second AMF.

The second request message is used to request to obtain a security context of the UE. The second request message carries indication information, and the indication information is used to indicate that the UE is validated.

Optionally, the indication information may be referred to as a reason value.

For example, that the first AMF determines that the UE is validated is mainly determining whether a registration request message received from the UE satisfies a preset condition. It should be understood that, before the first AMF sends the second request message to the second AMF, a method procedure shown in FIG. 3 further includes S311 to S316.

S311: The MME sends a forward relocation request message to the first AMF. This step is similar to S210 in FIG. 2, and details are not described herein again.

S312: The first AMF determines a mapped security context. This step is similar to S220 in FIG. 2, and details are not described herein again.

S313: The first AMF sends a forward relocation response message to the MIME. This step is similar to S230 in FIG. 2, and details are not described herein again.

S314: The MME sends a handover command message to the UE. This step is similar to S240 in FIG. 2, and details are not described herein again.

S315: The UE determines the mapped security context. This step is similar to S250 in FIG. 2, and details are not described herein again.

S316: The UE sends the registration request message to the first AMF. This step is similar to S260 in FIG. 2, and details are not described herein again.

Further, that the first AMF determines that the registration request message satisfies the preset condition includes: the first AMF successfully validates integrity protection for the registration request message; or the first AMF determines that the registration request message is a registration request message sent by the UE after the UE is handed over from a 4G communications system to a 5G communications system. For example, before receiving the registration request message sent by the UE, the first AMF receives the forward relocation request message sent by the MIME. Therefore, the first AMF can learn that the currently received registration request message is the registration request message received from the UE in a handover procedure.

For example, that the first AMF successfully validates integrity protection for the registration request message may also be referred to as that the first AMF successfully verifies the UE. In other words, the method procedure shown in FIG. 3 further includes S317 in which the first AMF verifies the UE.

In a possible implementation, the second request message is a user equipment context transfer service invoking request (Namf_Communication_UEContextTransfer) initiated by the first AMF shown in FIG. 2. Different from the user equipment context transfer service invoking request shown in FIG. 2, the user equipment context transfer service invoking request in this embodiment of this application includes a newly added information element (IE), namely, the indication information.

In another possible implementation, the second request message is another possible second request message that is sent by the first AMF to the second AMF and that is used to obtain the security context of the UE.

It should be understood that a specific form of the second request message is not limited in this application. The indication information may be added to existing signaling between the first AMF and the second AMF, or may be added to signaling newly added between the first AMF and the second AMF.

In another possible implementation, in this embodiment of this application, it is limited only that the first AMF needs to send the indication information to the second AMF before sending the user equipment context transfer service invoking request to the second AMF. In other words, the first AMF may directly send the indication information to the second AMF, without adding the indication information to the second request message. This possible implementation is not shown in FIG. 3.

It should be further understood that how the indication information indicates that the UE is validated is not limited in this application. In a possible implementation, the indication information may be a 5G-GUTI of the UE. In this case, the 5G-GUTI may be used to identify the UE and indicate that the UE is validated. In this implementation, a new indication function is added to an existing IE, and the second AMF may be notified, in a predefined manner, that the 5G-GUTI has the new function. In another possible implementation, the indication information may be at least one newly added bit, and a value of the bit is set to 1, to indicate that the UE is validated. The foregoing possible implementations are merely examples for description, and do not constitute any limitation on the protection scope of this application.

In a possible implementation, the indication information explicitly indicates that the UE is validated. Alternatively, in another possible implementation, the indication information implicitly indicates that the UE is validated. For example, the indication information indicates that integrity of the registration request message received by the first AMF from the UE is successfully validated.

Further, to enable the second AMF to determine that the first AMF needs to obtain the security context of the UE, the second request message further needs to carry an identity of the UE.

In a possible implementation, the identity of the UE may be the foregoing 5G-GUTI.

In another possible implementation, the identity of the UE may be a subscriber permanent identity (SUPI).

It should be understood that, if the first AMF determines, after receiving the 5G-GUTI of the UE from the UE, that the security context of the UE needs to be obtained from the second AMF, the first AMF may choose to continue to add the 5G-GUTI of the UE, the SUPI of the UE, or both the 5G-GUTI and the SUPI of the UE to the second request message.

Optionally, to enable the second AMF to obtain an UL NAS count of the UE, in a possible implementation, the second request message carries a plaintext registration request message, where the plaintext registration request message includes the UL NAS COUNT; or in a possible implementation, the second request message carries the UL NAS COUNT.

Further, after receiving the second request message sent by the first AMF, the second AMF learns, based on the indication information, that the UE is validated. In this case, the second AMF does not need to verify the UE, in other words, performs S320 in which the second AMF determines that the UE does not need to be verified.

S330: The second AMF sends a second response message to the first AMF.

The second response message carries the security context of the UE.

In this embodiment of this application, the second AMF does not need to verify the UE. After receiving the second request message sent by the first AMF, the second AMF directly returns the security context of the UE to the first AMF. This avoids a case in which the first AMF fails to obtain the security context of the UE because the second AMF fails to verify the UE.

Optionally, when the second request message carries the plaintext registration request message, or the second request message carries the UL NAS COUNT, the second AMF can obtain the UL NAS COUNT. For example, because the plaintext registration request message is a registration request message on which no security protection is performed, the second AMF does not need to validate the plaintext registration request message, and may directly obtain the UL NAS COUNT from the plaintext registration request message.

Further, the second AMF can perform key derivation on a first key in the security context of the UE based on the UL NAS COUNT. In this case, a key in the security context of the UE that is returned by the second AMF to the first AMF is a second key obtained by performing key derivation on the first key.

For example, when the key in the security context of the UE that is sent by the second AMF to the first AMF is the second key, the second AMF further needs to send key derivation indication information to the first AMF, to indicate that the second key is a key obtained through key derivation.

It should be understood that a procedure after the first AMF obtains the security context of the UE is similar to a procedure after the first AMF obtains the security context of the UE in an existing procedure of handing over the UE from the 4G communications system to the 5G communications system. For details, refer to the existing procedure. Details are not described herein again.

In the security context obtaining method shown in FIG. 3, the second request message sent by the first AMF to the second AMF carries the indication information, and the indication information is used to indicate that the UE is validated. Therefore, the second AMF can determine, based on the indication information, that the UE is validated, and does not need to verify the UE. After receiving the second request message carrying the indication information, the second AMF directly returns the security context of the UE to the first AMF. This avoids the case in which the first AMF fails to obtain the security context of the UE because the second AMF fails to verify the UE. This application further provides another security context obtaining method in which the second AMF verifies the UE. However, the method can improve a possibility that the second AMF successfully verifies the UE, thereby improving a possibility that the first AMF successfully obtains the security context of the user equipment from the second AMF.

Figure 4:
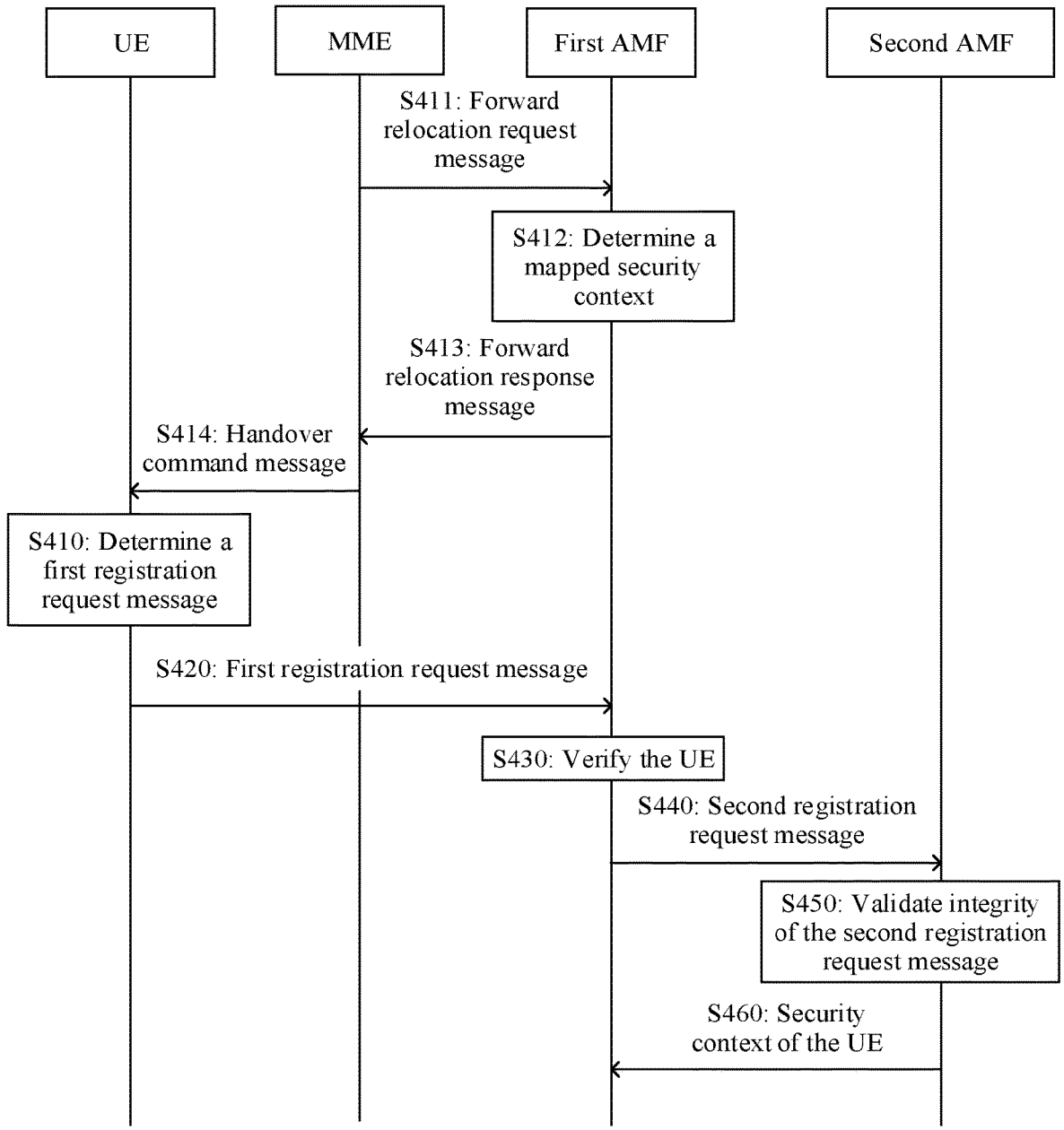
FIG. 4 is a schematic diagram of another security context obtaining method according to an embodiment of this application.

The following describes the security context obtaining method in detail with reference to FIG. 4. FIG. 4 is a schematic diagram of another security context obtaining method according to an embodiment of this application. The schematic diagram includes UE, an MME, a first AMF, and a second AMF.

The security context obtaining method includes the following steps.

S410: The UE determines a first registration request message.

The first registration request message carries a second registration request message. The second registration request message is integrity protected using a first security context, and the first security context is a native security context between the UE and the second AMF.

For example, that the UE determines the first registration request message is mainly determining the second registration request message. The second registration request message is a message obtained after the UE performs integrity protection on a fourth registration request message using the native security context. The fourth registration request message includes a GUTI, key identifier (ngKSI) information, and an UL NAS COUNT that are in a context of the UE that is between the UE and the second AMF. For ease of differentiation, the GUTI may be referred to as a native GUTI, and the key identifier may be referred to as a native key identifier.

Optionally, the fourth registration request message may have the following several possible cases.

Case 1:

The fourth registration request message is a message generated by the UE based on the native GUTI, the native key identifier, and the UL NAS COUNT. In Case 1, the fourth registration request message may also be referred to as a fourth message or may have another possible name. A name of the message is not limited in this embodiment of this application.

It should be understood that the fourth registration request message generated by the UE based on the context of the UE that is between the UE and the second AMF may alternatively be in another form. For example, in addition to the native GUTI, the native key identifier, and the UL NAS COUNT, the fourth registration request message generated by the UE further includes another information element (IE).

In Case 1, that the UE performs integrity protection on the fourth registration request message based on the first security context includes: The UE performs integrity protection on the fourth registration request message based on the first security context, and generates a first MAC. Therefore, carrying the second registration request message in the first registration request message may also be understood as carrying the first MAC and the fourth registration request message in the first registration request message.

Further, in Case 1, that the UE determines the first registration request message includes the following steps.

Step 1:

The UE constructs the fourth registration request message.

Step 2:

The UE performs integrity protection on the fourth registration request message based on the security context between the UE and the second AMF, and generates the first MAC.

Step 3:

The UE performs integrity protection on a third registration request message and the second registration request message (RR2) based on a mapped security context between the UE and the first AMF, and generates a fifth MAC. The third registration request message is the registration request message sent by the UE to the first AMF in the method procedure S260 shown in FIG. 2. For example, the third registration request message includes a GUTI and key identifier information that are in the mapped context between the UE and the first AMF. For ease of differentiation, the GUTI may be referred to as a mapped GUTI, and a key identifier may be referred to as a mapped key identifier.

In this case, the first registration request message includes the fourth registration request message (RR4), the third registration request message (RR3), the fifth MAC (MAC5), and the first MAC (MAC1). MAC1 is a MAC value obtained by performing integrity protection on RR4 using the native security context. MAC5 is a MAC value obtained by performing integrity protection on RR3 and RR2 using the mapped security context (or MAC5 is a MAC value obtained by performing integrity protection on RR3, RR4, and MAC1 using the mapped security context). It may also be understood that the first registration request message is a message on which integrity protection is performed sequentially based on the native security context and the mapped security context.

Case 2:

The fourth registration request message is a registration request message obtained after the UE performs integrity protection on a third registration request message based on a mapped security context.

In Case 2, that the UE performs integrity protection on the fourth registration request message based on the first security context includes: The UE performs integrity protection on the fourth registration request message based on the first security context, and generates a first MAC. Therefore, carrying the second registration request message in the first registration request message may also be understood as carrying the first MAC and the fourth registration request message in the first registration request message.

Further, in Case 2, that the UE determines the first registration request message includes the following steps.

Step 1:

The UE performs integrity protection on the third registration request message based on the mapped security context between the UE and the first AMF, and generates a third MAC.

Step 2:

The UE performs, based on the native security context between the UE and the second AMF, integrity protection on the third registration request message on which integrity protection is performed based on the mapped security context in the step 1, and generates the first MAC.

In this case, the first registration request message includes the third registration request message (RR3), the third MAC (MAC3), and the first MAC (MAC1). MAC3 is a MAC value obtained by performing integrity protection on RR3 using the mapped security context. MAC1 is a MAC value obtained by performing integrity protection on RR3 and MAC3 using the native security context. It may also be understood that the first registration request message is a message on which integrity protection is performed sequentially based on the mapped security context and the native security context.

Case 3:

The fourth registration request message is a third registration request message. The third registration request message is the registration request message sent by the UE to the first AMF in the method procedure S260 shown in FIG. 2.

In Case 3, that the UE performs integrity protection on the fourth registration request message based on the first security context includes: The UE performs integrity protection on the fourth registration request message based on the first security context, and generates a first MAC. Therefore, carrying the second registration request message in the first registration request message may also be understood as carrying the first MAC and the fourth registration request message in the first registration request message.

Further, in Case 3, that the UE determines the first registration request message includes the following steps.

Step 1:

The UE performs integrity protection on the third registration request message based on the native security context between the UE and the second AMF, and generates the first MAC.

Step 2:

The UE performs, based on a mapped security context between the UE and the first AMF, integrity protection on the third registration request message on which integrity protection is performed based on the native security context in the step 1, and generates a fourth MAC.

In this case, the first registration request message includes the third registration request message (RR3), the first MAC (MAC1), and the fourth MAC (MAC4). MAC1 is a MAC value obtained by performing integrity protection on RR3 using the native security context. MAC4 is a MAC value obtained by performing integrity protection on RR3 and MAC1 using the mapped security context. It may also be understood that the first registration request message is a message on which integrity protection is performed sequentially based on the native security context and the mapped security context.

It should be understood that, in Case 1, the first AMF can determine, based on both the mapped GUITI and the native GUTI that are carried in the first registration request message sent by the UE, to send the second registration request message that is integrity protected using the native security context to the second AMF.

It should be further understood that the foregoing Case 1 to Case 3 are merely examples to describe possible cases of the second registration request message and how the UE determines the first registration request message. Another undescribed possible form of the second registration request also falls within the protection scope of this application. For example, the fourth registration request message is another possible message constructed by the UE based on a native context.

S420: The UE sends the first registration request message to the first AMF.

For example, the UE sends the first registration request message determined in S410 to the first AMF.

It should be understood that the first registration request message sent by the UE to the first AMF may be forwarded by an access network device. A function of the access network device is not limited in this application. Therefore, that the first registration request message sent by the UE to the first AMF may be forwarded by the access network device is directly described as that the UE sends the first registration request message to the first AMF.

It should be further understood that, before the UE sends the first registration request message to the first AMF, the UE needs to determine the mapped security context. Therefore, before the UE sends the first registration request message to the first AMF, a method procedure shown in FIG. 4 further includes S411 to S414.

S411: The MME sends a forward relocation request message to the first AMF. This step is similar to S210 in FIG. 2, and details are not described herein again.

S412: The first AMF determines the mapped security context. This step is similar to S220 in FIG. 2, and details are not described herein again.

S413: The first AMF sends a forward relocation response message to the MME. This step is similar to S230 in FIG. 2, and details are not described herein again.

S414: The MME sends a handover command message to the UE. This step is similar to S240 in FIG. 2, and details are not described herein again.

For example, after receiving the handover command message, the UE derives the mapped security context. Further, the UE performs security protection on the first registration request message using the native security context and the mapped security context.

S430: The first AMF verifies the UE.

For example, that the first AMF determines that the UE is validated is mainly determining whether the first registration request message received from the UE satisfies a preset condition. That the first AMF determines that the first registration request message satisfies the preset condition includes: the first AMF successfully validates integrity protection for the first registration request message based on the mapped security context; or the first AMF determines that the first registration request message is a registration request message sent by the UE after the UE is handed over from a 4G communications system to a 5G communications system. For example, before receiving the first registration request message sent by the UE, the first AMF receives the forward relocation request message sent by the MME. Therefore, the first AMF can learn that the currently received first registration request message is the registration request message received from the UE in a handover procedure.

After verifying that the UE is validated, the first AMF sends the second registration request message to the second AMF, where the second registration request message is used by the second AMF to verify the UE. In other words, the method procedure shown in FIG. 4 further includes S440 in which the first AMF sends the second request message to the second AMF.

Optionally, the second registration request message is carried in a first request message, and is sent by the first AMF to the second AMF.

In a possible implementation, the first request message is a user equipment context transfer service invoking request (Namf_Communication_UEContextTransfer) initiated by the first AMF shown in FIG. 2. Different from the user equipment context transfer service invoking request shown in FIG. 2, the user equipment context transfer service invoking request in this embodiment of this application includes a newly added information element, namely, the first MAC.

In another possible implementation, the first request message is another possible first request message that is sent by the first AMF to the second AMF and that is used to obtain a security context of the UE.

It should be understood that a specific form of the first request message is not limited in this application. The first MAC may be added to existing signaling between the first AMF and the second AMF, or may be added to signaling newly added between the first AMF and the second AMF.

Further, to enable the second AMF to determine that the first AMF needs to obtain the security context of the UE, the first request message further carries an identity of the UE. For example, the identity of the UE is included in the second registration request message sent by the first AMF to the second AMF.

In a possible implementation, the identity of the UE may be the mapped GUTI.

In a possible implementation, the identity of the UE may be the native GUTI.

In another possible implementation, the identity of the UE may be an SUPI.

It should be understood that, if the first AMF determines, after receiving the mapped GUTI of the UE from the UE, that the security context of the UE needs to be obtained from the second AMF, the first AMF may choose to continue to add the mapped GUTI of the UE, the SUPI of the UE, or both the mapped GUTI and the SUPI of the UE to the first request message.

It should be further understood that, when the first registration request message received by the first AMF is the first registration request message shown in Case 1 in S410, the first registration request message carries the second registration request message, and the second registration request message includes the native GUTI. In this case, the first AMF may choose to add the native GUTI of the UE to the first request message.

Further, the second registration request message further includes the UL NAS COUNT of the UE, such that the second AMF can obtain the UL NAS COUNT of the UE.

Further, after receiving the first request message sent by the first AMF, the second AMF determines, based on an integrity validation result of the second registration request message, whether the UE is validated. To be more specific, the second AMF performs S450, in other words, validates integrity of the second registration request message.

The second AMF validates the integrity of the second registration request message based on the security context between the second AMF and the user equipment. For example, the second AMF generates a second MAC based on a natively stored security context, and compares the first MAC with the second MAC. When the first MAC is equal to the second MAC, the second AMF successfully verifies the UE, and determines that the UE is validated. In this case, the second AMF sends the security context of the UE to the first AMF.

It should be understood that the first MAC is a MAC generated by the UE based on the security context of the UE that is negotiated between the UE and the second AMF, and the second MAC is a MAC generated by the second AMF based on the security context of the UE that is negotiated between the UE and the second AMF. Therefore, there is a high probability that the first MAC is equal to the second MAC. In this case, the second AMF can successfully verify the UE, and returns the security context of the UE to the first AMF, unless the second AMF fails to verify the UE due to a low-probability event such as a transmission error. Compared with the method procedure shown in FIG. 2, the security context obtaining method shown in FIG. 4 improves a possibility that the first AMF successfully obtains the security context of the user equipment from the second AMF.

After successfully validating the integrity of the second registration request message, the second AMF performs S460, in other words, sends the security context of the user UE to the first AMF.

Optionally, the security context of the UE is carried in a first response message.

Further, if the security context of the UE is included in the context of the UE, the second AMF may send the context of the UE to the first AMF.

Optionally, the second AMF can perform key derivation on a first key in the security context of the UE based on the UL NAS COUNT. In this case, a key in the security context of the UE that is returned by the second AMF to the first AMF is a second key obtained by performing key derivation on the first key. In this embodiment of this application, the security context of the UE that includes the second key generated through key derivation may be referred to as a second security context. In other words, the security context of the UE that is sent by the second AMF to the first AMF may not undergo key derivation, may be the security context of the UE that is between the second AMF and the UE and that is natively stored in the second AMF, or may be the second security context when the second AMF performs, according to a local policy, key derivation on a key in the natively stored security context of the UE that is between the second AMF and the UE, to generate a derived key.

For example, when the key in the security context of the UE that is sent by the second AMF to the first AMF is the second key, the second AMF further needs to send key derivation indication information to the first AMF, to indicate that the second key is a key obtained through key derivation.

It should be understood that a procedure after the first AMF obtains the security context of the UE is similar to a procedure after the first AMF obtains the security context of the UE in an existing procedure of handing over the UE from the 4G communications system to the 5G communications system. For details, refer to the existing procedure. Details are not described herein again.

For example, the UE and the first AMF subsequently negotiate to use the native security context. The first AMF sends a non-access stratum (NAS) security mode command (SMC) message to the UE, and the UE validates integrity of the NAS SMC message. After the UE successfully validates the NAS SMC, the UE sends a non-access stratum security mode complete message to the first AMF.

In a possible implementation, when the second AMF fails to validate the integrity of the second registration request message, the second AMF sends failure indication information to the first AMF, to notify the first AMF that the second AMF fails to validate the integrity of the second registration request message.

Further, after the first AMF receives the failure indication information indicating that the second AMF fails to validate the integrity of the second registration request message, the first AMF determines, according to a local policy, that the first AMF may continue to use the mapped security context, or the first AMF determines to initiate initial authentication to the UE according to a local policy, and generates a new security context between the first AMF and the UE.

It should be understood that sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

The security context obtaining methods in the embodiments of this application are described above in detail with reference to FIG. 3 and FIG. 4. The following describes in detail security context obtaining apparatuses in the embodiments of this application with reference to FIG. 5 to FIG. 10.

Figure 5:
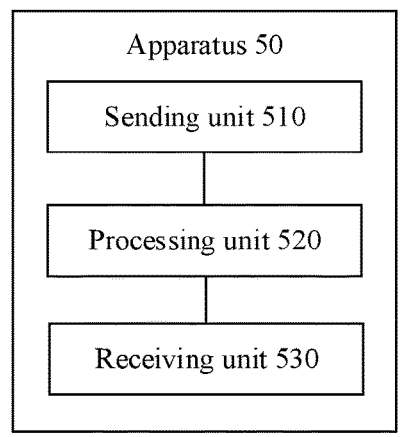
FIG. 5 is a schematic diagram of a security context obtaining apparatus 50 according to an embodiment of this application.

FIG. 5 is a schematic diagram of a security context obtaining apparatus 50 according to this application. As shown in FIG. 5, the apparatus 50 includes a sending unit 510, a processing unit 520, and a receiving unit 530.

The sending unit 510 is configured to send a first registration request message to a first AMF.

The processing unit 520 is configured to determine the first registration request message.

The receiving unit 530 is configured to receive a handover command message sent by an MME.

The apparatus 50 completely corresponds to the user equipment in the method embodiments. The apparatus 50 may be the user equipment in the method embodiments, or a chip or a functional module inside the user equipment in the method embodiments. The corresponding units of the apparatus 50 are configured to perform corresponding steps performed by the user equipment in the method embodiments shown in FIG. 3 and FIG. 4.

The sending unit 510 of the apparatus 50 performs a sending step performed by the user equipment in the method embodiments. For example, the sending unit 510 performs the step S316 of sending the registration request message to the first AMF in FIG. 3 and the step S420 of sending the first registration request message to the first AMF in FIG. 4.

The processing unit 520 performs a step implemented or processed inside the user equipment in the method embodiments. For example, the processing unit 520 performs the step S315 of determining the mapped security context in FIG. 3 and the step S410 of determining the first registration request message in FIG. 4.

The receiving unit 530 performs a receiving step performed by the user equipment in the method embodiments. For example, the receiving unit 530 performs the step S314 of receiving the handover command message sent by the MME in FIG. 3 and the step S414 of receiving the handover command message sent by the MME in FIG. 4.

The sending unit 510 and the receiving unit 530 shown in the apparatus 50 may constitute a transceiver unit that has both receiving and sending functions. The processing unit 520 may be a processor. The sending unit 510 may be a transmitter, and the receiving unit 530 may be a receiver. The receiver and the transmitter may be integrated to constitute a transceiver.

Figure 6:
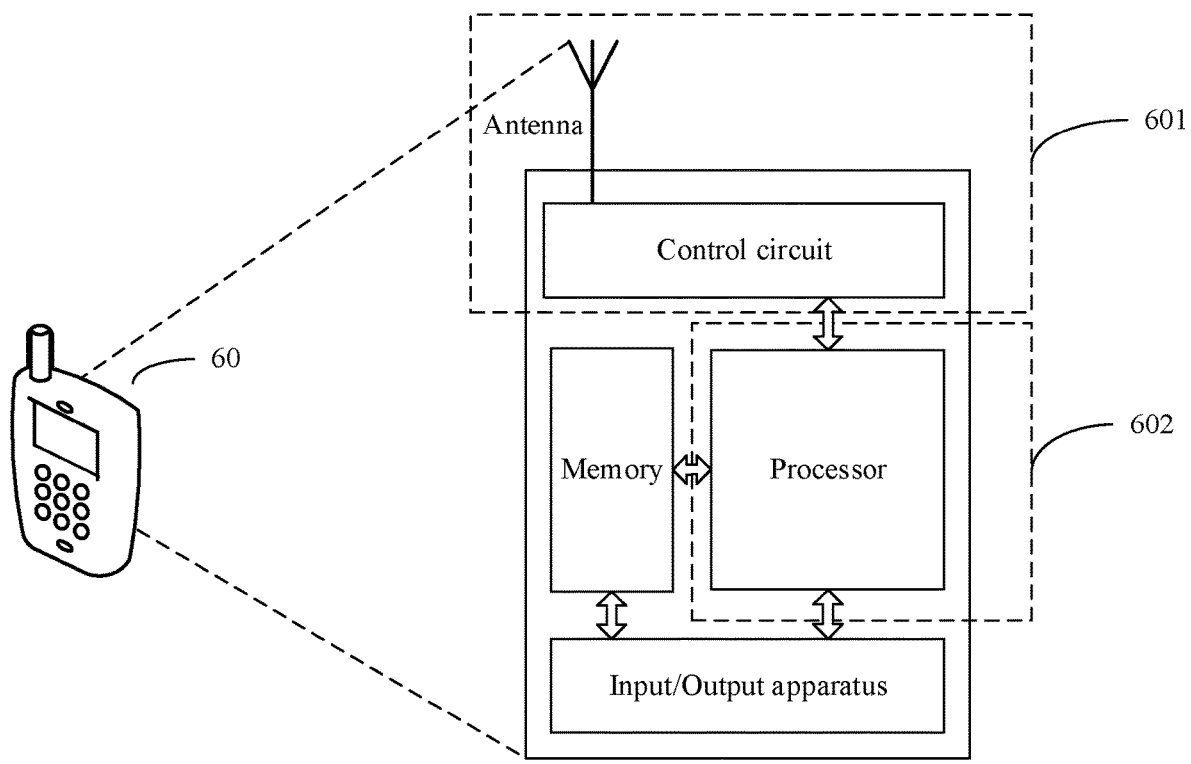
FIG. 6 is a schematic structural diagram of user equipment 60 according to an embodiment of this application.

FIG. 6 is a schematic structural diagram of a user equipment 60 applicable to an embodiment of this application. The user equipment 60 may be applied to the system shown in FIG. 1. For ease of description, FIG. 6 shows only main components of the user equipment. As shown in FIG. 6, the user equipment 60 includes a processor (corresponding to the processing unit 520 in FIG. 5), a memory, a control circuit, an antenna, and an input/output apparatus (corresponding to the sending unit 510 and the receiving unit 530 in FIG. 5). The processor is configured to control the antenna and the input/output apparatus to send and receive a signal. The memory is configured to store a computer program. The processor is configured to invoke the computer program from the memory and run the computer program, to perform a corresponding procedure and/or operation performed by the user equipment in the security context obtaining methods provided in this application. Details are not described herein again.

A person skilled in the art may understand that, for ease of description, FIG. 6 shows only one memory and only one processor. Actual user equipment may have a plurality of processors and a plurality of memories. The memory may also be referred to as a storage medium, a storage device, or the like. This is not limited in this embodiment of this application.

Figure 7:
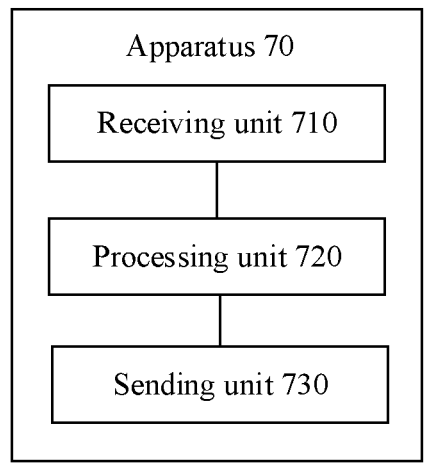
FIG. 7 is a schematic diagram of a security context obtaining apparatus 70 according to an embodiment of this application.

FIG. 7 is a schematic diagram of a security context obtaining apparatus 70 according to this application. As shown in FIG. 7, the apparatus 70 includes a receiving unit 710, a processing unit 720, and a sending unit 730.

The receiving unit 710 is configured to receive a first registration request message sent by user equipment, where the first registration request message carries a second registration request message, the second registration request message is integrity protected using a first security context, the first security context is a native security context between the user equipment and a second AMF, and a first AMF is an AMF providing an access and mobility management service for the user equipment after the user equipment is handed over from a 4G communications system to a 5G communications system.

The processing unit 720 is configured to determine a mapped security context.

The sending unit 730 is configured to send the second registration request message to the second AMF.

The apparatus 70 completely corresponds to the first AMF in the method embodiments. The apparatus 70 may be the first AMF in the method embodiments, or a chip or a functional module inside the first AMF in the method embodiments. The corresponding units of the apparatus 70 are configured to perform corresponding steps performed by the first AMF in the method embodiments shown in FIG. 3 and FIG. 4.

The receiving unit 710 of the apparatus 70 performs a receiving step performed by the first AMF in the method embodiments. For example, the receiving unit 710 performs the step S311 of receiving the forward relocation request message sent by the MME in FIG. 3, the step S411 of receiving the forward relocation request message sent by the MME in FIG. 4, the step S316 of receiving the registration request message sent by the UE in FIG. 3, the step S420 of receiving the first registration request message sent by the UE in FIG. 3, the step S330 of receiving the second response message sent by the second AMF in FIG. 3, and the step S460 of receiving the security context of the UE that is sent by the second AMF in FIG. 4.

The processing unit 720 performs a step implemented or processed inside the first AMF in the method embodiments. For example, the processing unit 720 performs the step S312 of determining the mapped security context in FIG. 3, the step S412 of determining the mapped security context in FIG. 4, the step S317 of verifying the UE in FIG. 3, and the step S430 of verifying the UE in FIG. 4.

The sending unit 730 performs a sending step performed by the first AMF in the method embodiments. For example, the sending unit 730 performs the step S313 of sending the forward relocation response message to the MME in FIG. 3, the step S413 of sending the forward relocation response message to the MME in FIG. 4, the step S310 of sending the second request message to the second AMF in FIG. 3, and the step S440 of sending the second registration request message to the second AMF in FIG. 4.

The receiving unit 710 and the sending unit 730 may constitute a transceiver unit that has both receiving and sending functions. The processing unit 720 may be a processor. The sending unit 730 may be a transmitter. The receiving unit 710 may be a receiver. The receiver and the transmitter may be integrated to constitute a transceiver.

Figure 8:
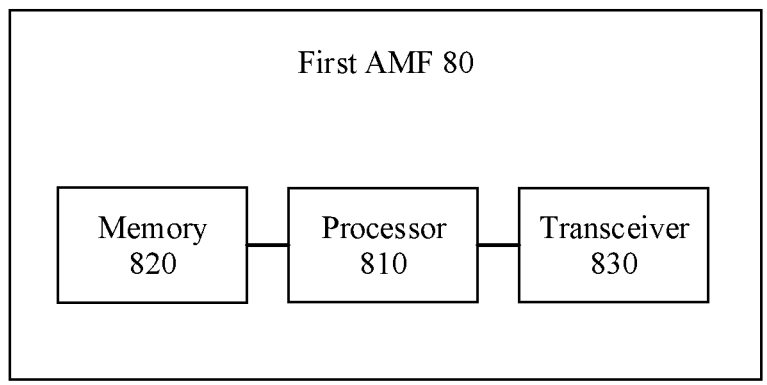
FIG. 8 is a schematic structural diagram of a first AMF 80 according to an embodiment of this application.

As shown in FIG. 8, an embodiment of this application further provides a first AMF 80. The first AMF 80 includes a processor 810, a memory 820, and a transceiver 830. The memory 820 stores an instruction or a program, and the processor 830 is configured to execute the instruction or the program stored in the memory 820. When the instruction or the program stored in the memory 820 is executed, the transceiver 830 is configured to perform operations performed by the receiving unit 710 and the sending unit 730 in the apparatus 70 shown in FIG. 7.

Figure 9:
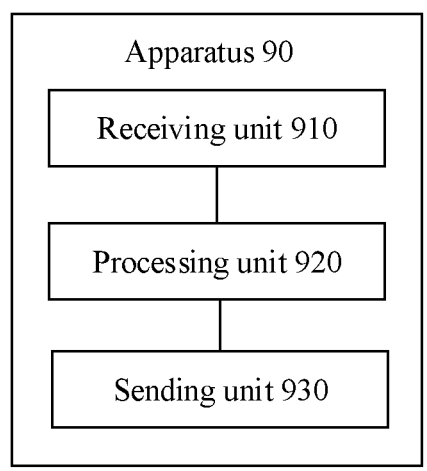
FIG. 9 is a schematic diagram of a security context obtaining apparatus 90 according to an embodiment of this application.

FIG. 9 is a schematic diagram of a security context obtaining apparatus 90 according to this application. As shown in FIG. 9, the apparatus 90 includes a receiving unit 910, a processing unit 920, and a sending unit 930.

The receiving unit 910 is configured to receive a second registration request message sent by a first AMF, where the second registration request message is integrity protected using a first security context, and the first security context is a native security context between a user equipment and a second AMF.

The processing unit 920 is configured to validate integrity of the second registration request message.

The sending unit 930 is configured to: when the processing unit 920 successfully validates the integrity of the second registration request message, send a security context of the user equipment to the first AMF.

The apparatus 90 completely corresponds to the second AMF in the method embodiments. The apparatus 90 may be the second AMF in the method embodiments, or a chip or a functional module inside the second AMF in the method embodiments. The corresponding units of the apparatus 90 are configured to perform corresponding steps performed by the second AMF in the method embodiments shown in FIG. 3 and FIG. 4.

The receiving unit 910 of the apparatus 90 performs a receiving step performed by the second AMF in the method embodiments. For example, the receiving unit 910 performs the step S310 of receiving the second request message sent by the first AMF in FIG. 3 and the step S440 of receiving the second registration request message sent by the first AMF in FIG. 4.

The processing unit 920 performs a step implemented or processed inside the second AMF in the method embodiments. For example, the processing unit 920 performs the step S320 of determining that the UE does not need to be verified in FIG. 3 and the step S450 of validating the integrity of the second registration request message in FIG. 4.

The sending unit 930 performs a sending step performed by the second AMF in the method embodiments. For example, the sending unit 930 performs the step S330 of sending the second response message to the first AMF in FIG. 3 and the step S460 of sending the security context of the UE to the first AMF in FIG. 4.

The receiving unit 910 and the sending unit 930 may constitute a transceiver unit that has both receiving and sending functions. The processing unit 920 may be a processor. The sending unit 930 may be a transmitter, and the receiving unit 910 may be a receiver. The receiver and the transmitter may be integrated to constitute a transceiver.

Figure 10:
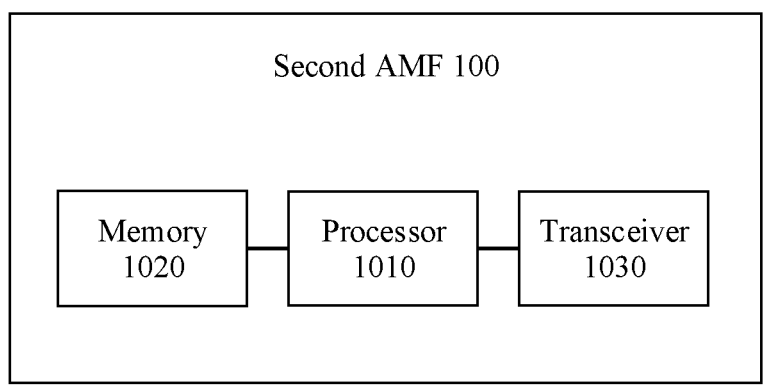
FIG. 10 is a schematic structural diagram of a second AMF 100 according to an embodiment of this application.

As shown in FIG. 10, an embodiment of this application further provides a second AMF 100. The second AMF 100 includes a processor 1010, a memory 1020, and a transceiver 1030. The memory 1020 stores an instruction or a program, and the processor 1030 is configured to execute the instruction or the program stored in the memory 1020. When the instruction or the program stored in the memory 1020 is executed, the transceiver 1030 is configured to perform operations performed by the receiving unit 910 and the sending unit 930 in the apparatus 90 shown in FIG. 9.

An embodiment of this application further provides a computer-readable storage medium. The computer-readable storage medium stores an instruction. When the instruction is run on a computer, the computer is enabled to perform steps performed by the first AMF in the methods shown in FIG. 3 and FIG. 4.

An embodiment of this application further provides a computer-readable storage medium. The computer-readable storage medium stores an instruction. When the instruction is run on a computer, the computer is enabled to perform steps performed by the second AMF in the methods shown in FIG. 3 and FIG. 4.

An embodiment of this application further provides a computer program product that includes an instruction. When the computer program product runs on a computer, the computer is enabled to perform steps performed by the first AMF in the methods shown in FIG. 3 and FIG. 4.

An embodiment of this application further provides a computer program product that includes an instruction. When the computer program product runs on a computer, the computer is enabled to perform steps performed by the second AMF in the methods shown in FIG. 3 and FIG. 4.

An embodiment of this application further provides a chip, including a processor. The processor is configured to read a computer program stored in a memory and run the computer program, to perform a corresponding operation and/or procedure performed by the second AMF in the security context obtaining methods provided in this application. Optionally, the chip further includes the memory. The memory is connected to the processor through a circuit or a cable. The processor is configured to read the computer program from the memory and execute the computer program. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application further provides a chip, including a processor. The processor is configured to invoke a computer program stored in a memory and run the computer program, to perform a corresponding operation and/or procedure performed by the first AMF in the security context obtaining methods provided in this application. Optionally, the chip further includes the memory. The memory is connected to the processor through a circuit or a cable. The processor is configured to read the computer program from the memory and execute the computer program. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

In addition, the term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may represent: Only A exists, only B exists, only C exists, both A and B exist, and both A and C exist, C and B exist, and A, B, and C exist.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
   a first access and mobility management function (AMF) configured to:
   receive a first registration request message from a user equipment (UE) after the UE is handed over from a 4G communication system to a 5G communication system,
   wherein the first AMF is part of the 5G communication system;
   validate integrity of the first registration request message; and
   send a second request message to a second AMF if the integrity of the first registration request message is successfully validated; and
   a second AMF configured to:
   receive the second request message; and
   send a 5G security context of the UE to the first AMF if the second request message carries indication information and the indication information indicates that the UE is validated, wherein the second request message is configured to cause the second AMF to skip verifying the UE, and wherein the second AMF is part of the 5G communication system.

2. The system of claim 1, further comprising a mobility management network element (MME) that is configured to send a forward relocation request message to the first AMF, wherein the forward relocation request message comprises a 4G security context between the UE and the MME,
   wherein the first AMF is further configured to determine a mapped security context based on the 4G security context between the UE and the MME,
   wherein the integrity of the first registration request is validated based on the mapped security context.

3. A first mobility management device, comprising:
   one or more processors; and
   one or more memories coupled to the one or more processors, wherein the one or more memories store computer instructions that, when executed by the one or more processors, cause the first mobility management device to be configured to:
   receive a first registration request message from a user equipment (UE) after a handover from a first communication system to a second communication system, wherein the first mobility management device is part of the second communication system;
   validate integrity of the first registration request message based on a mapped security context that is based on a first security context, wherein the first registration request message is security protected by the mapped security context of the UE;
   send a second request message to a second mobility management device when the first mobility management device successfully validates the integrity of the first registration request message, wherein the second request message includes indication information that indicates that the UE is validated, wherein the second request message is configured to cause the second mobility management device to skip verifying the UE, and wherein the second mobility management device is part of the second communication system, wherein skipping verifying the UE comprises skipping validating the integrity of the second request message; and
   receive a second security context of the UE from the second mobility management device based on the second request message.

4. The first mobility management device of claim 3, wherein the first mobility management device is a first access and mobility management function (AMF), the second mobility management device is a second AMF, the first communication system is a 4G communication system, the second communication system is a 5G communication system, the first security context is a 4G security context, and the second security context is a 5G security context.

5. The first mobility management device of claim 4, wherein before receiving the first registration request message from the UE, the instructions, when executed by the one or more processors, further cause the first AMF to be configured to:

receive, during the handover, a forward relocation request message from a mobility management entity (MME), wherein the forward relocation request message includes the 4G security context of the UE; and determine the mapped security context of the UE based on the 4G security context.

6. The first mobility management device of claim 5, wherein the 4G security context of the UE is a context generated by negotiation between the UE and the MME in a 4G communication system.

7. The first mobility management device of claim 5, wherein the 4G security context comprises a key ($K_{ASME}$) and a next hop (NH) parameter, wherein the mapped security context comprises a key ($K_{AMF1}$), wherein the key $K_{AMF1}$ is obtained by the key $K_{ASME}$ and the NH parameter based on a preset derivation formula, the preset derivation formula including:

$K_{AMF1}$=HMAC-SHA-256 (KEY, FC∥P0∥L0), wherein FC=0x76, P0=NH parameter, L0=length of NH parameter, and KEY=$K_{ASME}$, wherein the instructions, when executed by the one or more processors, further cause the first AMF to be configured to calculate an integrity protection key ($K_{NASint1}$) and a confidentiality protection key ($K_{NASenc1}$) based on the key $K_{AMF1}$ and a security algorithm negotiated with the UE, wherein a calculation formula for generating the integrity protection key $K_{NASint1}$ includes:

$K_{NASint1}$=HMAC-SHA-256 (KEY, S), wherein S=FC∥P0$_1$∥L0$_1$∥P1$_1$∥L1$_1$, FC=0x69, P0$_1$ is an algorithm type distinguisher, L0$_1$ is a length of the algorithm type distinguisher, P1$_1$ is an algorithm identity, L1$_1$ is a length of the algorithm identity, and KEY=$K_{AMF1}$, and wherein a calculation formula for generating the confidentiality protection key $K_{NASenc1}$ includes:

$K_{NASenc1}$=HMAC-SHA-256 (KEY, S), wherein S=FC∥P0∥L0∥P1|L1, FC=0x69, P0 is an algorithm type distinguisher, L0 is a length of the algorithm type distinguisher, P1 is an algorithm identity, L1 is a length of the algorithm identity, and KEY=$K_{AMF1}$.

8. The first mobility management device of claim 4, wherein the second request message further comprises a 5G globally unique temporary identity (GUTI) of the UE, wherein the 5G security context of the UE is determined based on the 5G GUTI, wherein the first registration request message comprises the 5G GUTI, wherein the indication information that indicates that the UE is validated comprises indication information that indicates the integrity of the first registration request message is successfully validated, wherein the second AMF is an AMF in which the 5G security context of the UE is saved, and wherein the second AMF is an AMF in addition to the first AMF in the 5G communication system.

9. The first mobility management device of claim 8, wherein the 5G security context is saved by the second AMF based on either:

a) the UE being handed over from the 5G communication system to the 4G communication system before the UE is handed over from the 4G communication system to the 5G communication system; or b) the UE supporting dual connectivity and accessing the 5G communication system through a non-3GPP connection and accessing the 4G communication system through a 3GPP connection at the same time, and the UE being in a connected mode when handed over from the 4G communication system to the 5G communication system.

10. The first mobility management device of claim 4, wherein the first AMF is an AMF that is selected, by a mobility management entity (MME) of a 4G communication system, from the 5G communication system for the UE to provide a core network service, during the handover of the UE from the 4G communication system to the 5G communication system.

11. The first mobility management device of claim 4, wherein the first registration request message is received after the UE has completed a handover procedure from the 4G communication system to the 5G communication system.

12. The first mobility management device of claim 4, wherein the UE is in a connected state.

13. The first mobility management device of claim 4, wherein if the first AMF is unsuccessful in validating the integrity of the first registration request message, the instructions, when executed by the one or more processors, further cause the first AMF to be configured to either:

a) continue to use the mapped security context generated through negotiation with the UE; or b) initiate initial authentication to the UE to generate a security context between the first AMF and the UE.

14. The first mobility management device of claim 4, wherein if the first AMF is unsuccessful in validating the integrity of the first registration request message, the first AMF cannot receive a security context of the UE from the second AMF.

15. The first mobility management device of claim 4, wherein the first AMF is configured to validate integrity of the first registration request message in response to receiving the first registration request message.

16. The first mobility management device of claim 4, wherein after the first AMF receives the first registration request message and before the second AMF receives the second request message, the second AMF has not verified the UE.

17. A method, comprising:

receiving, by a second access and mobility management function (AMF), a request message from a first AMF, wherein the request message is received after a user equipment (UE) completes a handover procedure from a 4G communication system to a 5G communication system, and wherein the first AMF is part of the 5G communication system and the second AMF is part of the 5G communication system; and sending, by the second AMF if the request message carries indication information and the indication information indicates that the UE is validated, a native 5G security context of the UE to the first AMF without verifying integrity of the request message, wherein the request message is configured to cause the second AMF to skip verifying the UE, wherein skipping verifying the UE comprises skipping validating the integrity of the request message.

18. The method of claim 17, wherein the request message further comprises an identity 5G globally unique temporary identity (GUTI) of the UE, wherein the native 5G security context of the UE is based on the 5G GUTI, wherein the indication information that indicates that the UE is validated comprises indication information that indicates integrity of a first registration request message is successfully validated, wherein the second AMF is an AMF in which the native 5G security context of the UE is saved, wherein the first AMF is an AMF that is selected, by a mobility management entity (MME) of a 4G communication system, from the 5G communication system for the UE to provide a core network service.

19. The method of claim 18, the native 5G security context is saved by the second AMF based on either:
   a) the UE being handed over from the 5G communication system to the 4G communication system before the UE is handed over from the 4G communication system to the 5G communication system; or
   b) the UE supporting dual connectivity and accessing the 5G communication system through a non-3GPP connection, and accessing the 4G communication system through a 3GPP connection at the same time, and the UE being in a connected mode when handed over from the 4G communication system to the 5G communication system.

20. A second access and mobility management function (AMF), comprising:
   one or more processors; and
   one or more memories coupled to the one or more processors, wherein the one or more memories store computer instructions that, when executed by the one or more processors, cause the second AMF to be configured to perform the method of claim 17.

* * * * *

UNITED STATES PATENT AND TRADEMARK OFFICE
CERTIFICATE OF CORRECTION

PATENT NO. : 12,170,901 B2
APPLICATION NO. : 18/485137
DATED : December 17, 2024
INVENTOR(S) : Fei Li and Bo Zhang Page 1 of 1

It is certified that error appears in the above-identified patent and that said Letters Patent is hereby corrected as shown below:

In the Claims

Claim 7, Column 37, Line 41: "S = FC||P01||L01||P11|L11," should read "S = FC||P01||L01||P11||L11,"

Signed and Sealed this
Eleventh Day of February, 2025

Coke Morgan Stewart
*Acting Director of the United States Patent and Trademark Office*